United States Patent
Reed

(10) Patent No.: US 10,934,098 B2
(45) Date of Patent: *Mar. 2, 2021

(54) METHODS OF CONVEYING AND SIZING PRODUCE

(71) Applicant: Lorin Reed, Kingsburg, CA (US)

(72) Inventor: Lorin Reed, Kingsburg, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/836,594

(22) Filed: Mar. 31, 2020

(65) Prior Publication Data
US 2020/0307918 A1 Oct. 1, 2020

Related U.S. Application Data

(63) Continuation of application No. 16/198,655, filed on Nov. 21, 2018, now Pat. No. 10,618,740.
(Continued)

(51) Int. Cl.
*B65G 23/08* (2006.01)
*B65G 43/00* (2006.01)
(Continued)

(52) U.S. Cl.
CPC .............. *B65G 23/08* (2013.01); *B65G 15/58* (2013.01); *B65G 17/12* (2013.01); *B65G 17/18* (2013.01);
(Continued)

(58) Field of Classification Search
CPC ........ B65G 23/08; B65G 43/00; B65G 17/16; B65G 17/18; B65G 2201/0211;
(Continued)

(56) References Cited

U.S. PATENT DOCUMENTS

| 3,768,645 A | 10/1973 | Conway et al. |
| 3,782,515 A | 1/1974 | Cowen |

(Continued)

FOREIGN PATENT DOCUMENTS

| CN | 202897467 | 4/2013 |
| EP | 0199045 | 10/1986 |

(Continued)

OTHER PUBLICATIONS

International Search Report (ISR) and Written Opinion from co-pending PCT application PCT/US2018/062340 dated Feb. 8, 2019 (PCT/ISA/220, PCT/ISA/210 and PCT/ISA/237).

*Primary Examiner* — Mark A Deuble
(74) *Attorney, Agent, or Firm* — Sierra IP Law, P.C.; Mark D. Miller; William K. Nelson

(57) ABSTRACT

The present invention includes conveying and sorting systems utilizing a plurality of continuous rails which support a plurality of sliding pucks that are urged forward using a plurality of sprocket wheels, and which utilize magnetically operated activation components for causing produce to be selectively dropped from cups carried by the pucks into sorting bins. The structures for the conveying and actuating components of the systems have smooth external surfaces reducing potential contamination by bacteria, contaminants and debris, thereby making them easily accessible for cleaning, and allowing for longer continuous operation times and higher efficiency.

22 Claims, 17 Drawing Sheets

Related U.S. Application Data

(60) Provisional application No. 62/590,144, filed on Nov. 22, 2017.

(51) Int. Cl.

| | | |
|---|---|---|
| *B65G 15/58* | (2006.01) | |
| *B65G 47/96* | (2006.01) | |
| *B65G 23/06* | (2006.01) | |
| *B65G 17/12* | (2006.01) | |
| *B65G 17/18* | (2006.01) | |

(52) U.S. Cl.
CPC ............. *B65G 23/06* (2013.01); *B65G 43/00* (2013.01); *B65G 47/962* (2013.01); *B65G 2201/0211* (2013.01)

(58) Field of Classification Search
CPC .... B65G 47/962; B65G 17/12; B65G 47/965; B65G 47/38; B65G 47/40; G01G 13/22
USPC .................................................... 198/370.04
See application file for complete search history.

(56) References Cited

U.S. PATENT DOCUMENTS

| | | |
|---|---|---|
| 5,024,047 A | 6/1991 | Leverett |
| 5,244,100 A | 9/1993 | Regier et al. |
| 5,307,294 A | 4/1994 | Aman et al. |
| 5,377,816 A | 1/1995 | Deligi et al. |
| 5,674,335 A | 10/1997 | Aman et al. |
| 5,899,320 A | 5/1999 | Miyasaka |
| 6,244,427 B1 | 6/2001 | Syverson |
| 6,286,659 B1 | 9/2001 | Petrovic |
| 6,615,975 B2 | 9/2003 | Ranger et al. |
| 6,710,505 B1 | 3/2004 | Barani et al. |
| 6,854,592 B2 | 2/2005 | Fukuoka |
| 6,959,804 B2 | 11/2005 | Helgerson et al. |
| 7,134,258 B2 | 11/2006 | Kalany et al. |
| 7,175,018 B2 | 2/2007 | Helgerson et al. |
| 7,258,882 B2 | 8/2007 | Hankinson et al. |
| 8,011,495 B2 | 9/2011 | Anderson et al. |
| 8,102,095 B2 | 1/2012 | Hoffmann et al. |
| 8,714,365 B2 | 5/2014 | Morley |
| 8,720,673 B2 | 5/2014 | Loecht |
| 8,727,101 B2 | 5/2014 | Chiarini et al. |
| 8,757,364 B2 | 6/2014 | Obst |
| 8,776,985 B2 | 7/2014 | Huettner et al. |
| 9,067,735 B2 | 6/2015 | Kim |
| 9,475,643 B1 | 10/2016 | Odman et al. |
| 9,688,473 B2 | 6/2017 | Reed |
| 10,618,740 B2 * | 4/2020 | Reed ..................... B65G 17/12 |
| 2003/0198716 A1 | 10/2003 | Hankinson et al. |
| 2004/0016626 A1 | 1/2004 | Helgerson et al. |
| 2004/0035684 A1 | 2/2004 | Fukuoka |
| 2004/0094253 A1 | 5/2004 | Jenkins et al. |
| 2005/0098620 A1 | 5/2005 | Dunlap, Jr. |
| 2006/0016668 A1 | 1/2006 | Helgerson et al. |
| 2008/0032010 A1 | 2/2008 | Hankinson et al. |
| 2008/0236998 A1 | 3/2008 | Shurko |
| 2010/0084247 A1 | 4/2010 | Wipf et al. |
| 2011/0005898 A1 | 1/2011 | Pundsack et al. |
| 2011/0067975 A1 | 3/2011 | Pazdernik |
| 2011/0252986 A1 | 10/2011 | Pitzer et al. |
| 2012/0006648 A1 | 1/2012 | Obst |
| 2013/0056332 A1 | 3/2013 | Cavina |
| 2014/0076692 A1 | 3/2014 | Loecht et al. |
| 2014/0096900 A1 | 4/2014 | Wojdyla et al. |
| 2014/0097066 A1 | 4/2014 | Kim |
| 2014/0110227 A1 | 4/2014 | Ragan et al. |
| 2014/0305773 A1 | 10/2014 | Agnoff |
| 2015/0047295 A1 | 2/2015 | Loecht |

FOREIGN PATENT DOCUMENTS

| | | |
|---|---|---|
| EP | 1348488 A2 | 10/2003 |
| EP | 1964794 | 9/2008 |
| GB | 2472020 | 1/2011 |
| WO | 1999000317 | 1/1999 |
| WO | WO2013131141 A1 | 9/2013 |
| WO | WO2016166439 A1 | 10/2016 |
| WO | W2017068534 A1 | 4/2017 |

\* cited by examiner

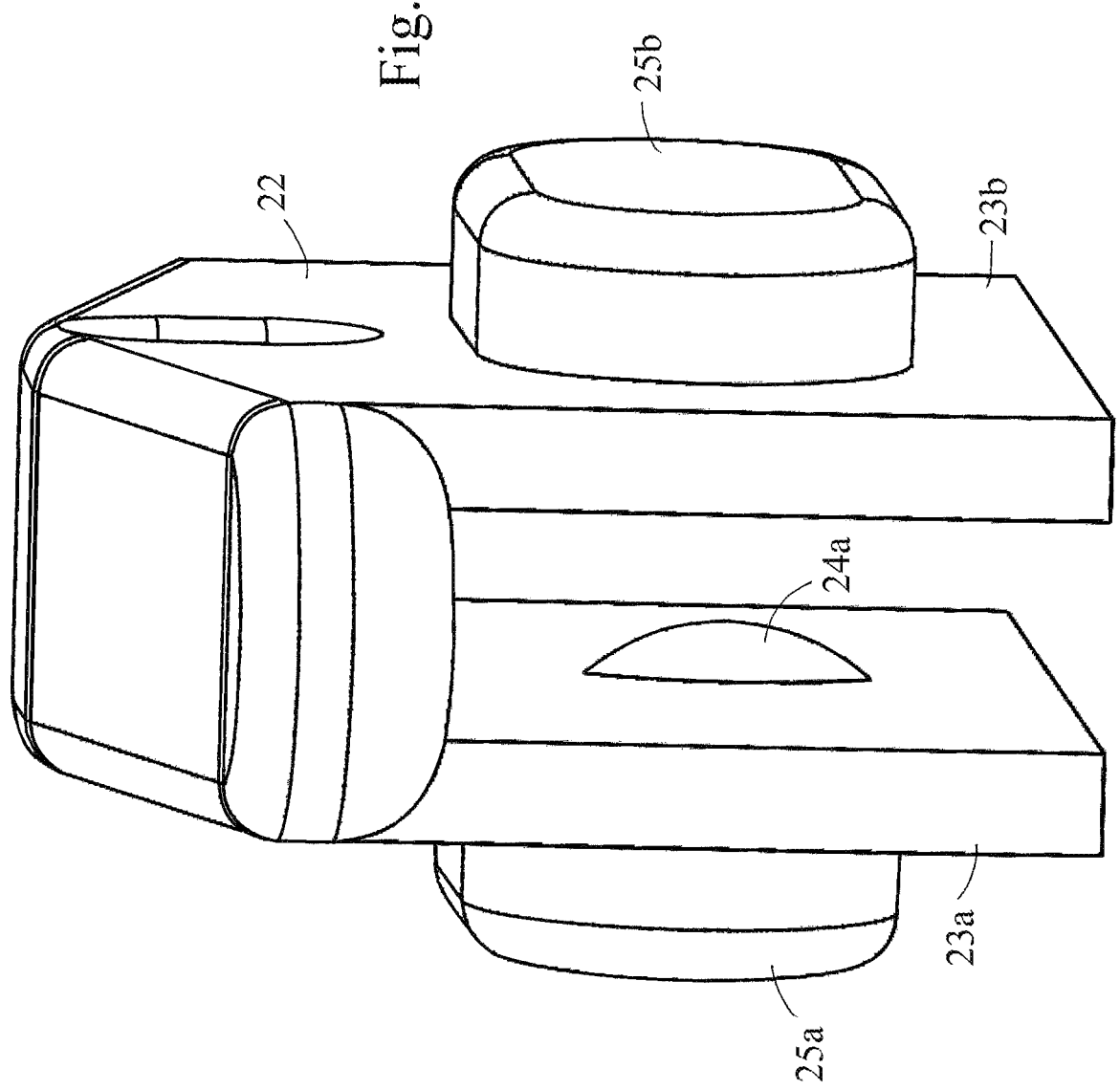

METHODS OF CONVEYING AND SIZING PRODUCE

FIELD OF THE INVENTION

The present invention relates to produce conveying and sizing equipment, and more particularly to improved produce conveying, sorting and sizing apparatus that is less susceptible to contamination and is easily cleaned, and methods of using the same.

BACKGROUND

Conventional produce handling and sorting/sizing equipment include cups or other structures that travel along pathways in the conveying and sorting/sizing system and support individual pieces of produce as they are carried through the system. Typically, these systems have a photographic zone, a weighing zone and a sorting/sizing zone. The produce pieces are placed on individual cups, and first passed through the photographic zone to evaluate the condition and quality of the produce, and then passed through a weighing zone. The produce pieces are then transported on a conveyor from the weighing zone into an appropriate sorting/sizing area where they are separated according to size, shape, color, weight or other factors. Existing systems typically include a computer that analyzes each piece of produce by weight, size, and blemish to determine into which sorting table or bin the produce should be discharged from the conveyor. When a particular piece of produce arrives at an appropriate sorting table, the cup or other support structure holding that piece of produce is actuated by the system which may cause it to pivot or otherwise drop the piece of produce in that cup onto the sorting table below.

In a typical sorting/sizing system, the cups holding the individual pieces of produce are attached to continuous chains which carry them through the system. In some existing systems, the pivots on the cups holding the produce pieces are often activated using solenoids or other similar physical actuators. These solenoids are located along the tracks along which the cups are traveling, with at least one solenoid associated with each track over each sorting table. When the cup holding a particular piece of produce arrives over the sorting table that has been selected for it by the computer system, the solenoid for that table is briefly activated as the cup goes by. This causes an extension to protrude from the solenoid which contacts the cup causing it to pivot and drop the produce it is carrying. The solenoid then immediately retracts so as not to make unwanted contact with the next cup coming down the track. A plurality of parallel tracks with chains supporting the pivotable cups are provided in these systems such that a plurality of solenoids are needed on each track at each sorting table. The solenoids are provided on cross beams below the tracks of cups, and pairs of wires extend from the sides of the conveying system to each solenoid. Unfortunately, the continuous chains, the wires, the cross beams and the solenoids themselves provide numerous irregular openings and surfaces where contamination and debris may accumulate over time, especially when thousands of pieces of produce travel through such systems on a typical day. As a result, it is difficult to completely clean these systems. This increases the risk that contamination, including *listeria* or other pathogens, may be transferred to the cups, to the produce, and to consumers of the produce. Accordingly, there is a need for improved produce sorting and sizing systems having parts that may be more easily and thoroughly cleaned in order to prevent unwanted contamination of the produce.

Conventional sorting/sizing systems also suffer from maintenance and cleaning challenges. Existing conveying systems typically use roller chains to drive the system, which tend to stretch over time, resulting in variance in the timing and movement of the conveyor, and the cups or other support structures that are driven along the conveyor. Additionally, the roller chain is susceptible to rust if the conveying system is washed with water or aqueous solution, resulting in deterioration of the function of the conveying system and needed repairs. Deterioration and variance in the operation of the conveying system can easily lead to errors in sorting the produce, since such systems work at high speeds. As a result, there is an ongoing need to improve the durability and efficiency of such equipment.

SUMMARY OF THE INVENTION

Embodiments of the present invention provide improved produce conveying, sorting and sizing methods and apparatus that utilize a plurality of continuous parallel conveyor rails along which a plurality of individual pucks supporting produce cups are slidably moved. Motion is preferably imparted to the pucks by rotatable sprocket wheels provided at the beginning of each conveyor rail, rather than by continuous chains or belts extending along the length of the conveyor. Additionally, the present invention includes a new actuation system for moving produce off of the sorting conveyor cups and into the appropriate sorting table or bin which utilizes actuators operated using electromagnets located behind the walls and/or inside the structures supporting the sorting cups and conveyors, rather than external devices such as solenoids. Embodiments of the present invention therefore improve the durability and cleanability of produce sorting, sizing and conveying systems.

Embodiments of the present invention include a plurality of parallel continuous (endless) conveyor tracks, each track comprising a rail or slide along which a plurality of pucks are moved in the direction of conveyance. The pucks may be advanced along each track by one or more driving systems preferably in the form of large sprocketed wheels that briefly engage the pucks at one end of the conveyance system and push them into each other so that they slide along the rails. For lengthy conveyance systems, one or more additional sprocketed wheels may be provided at intervals along the rails to further urge the pucks being conveyed. Each puck may include a pair of legs that are designed to straddle the sides of each rail. Both sides of the rails have continuous indentations along their lengths, which correspond to protrusions located on the inside surfaces of the legs of each puck. The pucks are engaged with the rails such that the leg protrusions engage with the rail indentations which keep the pucks on the rails as they travel along them. It is to be appreciated that in alternative embodiments, the indentations and protrusions may be provided in opposite locations, i.e., the protrusions may be provided on the sides of the rails, and the corresponding indentations may be provided on the insides of the puck legs. The shapes of the indentations and protrusions should be complementary to avoid unnecessary friction, and may be in any suitable form including without limitation rounded, concave/convex, elliptical, orthogonal, or other suitable complementary structures. In some embodiments, the legs and rails may dovetail together, and/or the pucks may be popped onto and off of the rails.

In some embodiments, elongated guides may be provided along the length of the rails. For example, and without limitation, ridges may be provided along the top surfaces of the rails, and the pucks may have a complementary recess underneath that mates with and slides along the ridge. It is to be appreciated that one or more ridges may be provided at any suitable location along the rails including the top and/or one or both sides and/or the bottom of the rail, so long as complementary recess is provided on the puck where it engages the ridge. It is also to be appreciated that the locations of the ridges and recesses may be reversed, such that the pucks may be provided with ridges which engage complementary elongated recesses running along the lengths of the rails.

Each puck may include at least one produce cup that may be a part of the puck itself, fixedly attached to the puck, or mechanically connected to the puck such that it can pivot laterally (e.g., perpendicularly to the direction of conveyance) to deposit produce into an appropriate sorting table or bin. The track may be a complete loop around which the pucks travel, where the track includes an upper portion that may include a photographic zone and/or a weighing zone, and a lower portion that receives the pucks after they reach the end of the upper portion and returns the pucks to one or more driving mechanisms of the conveyor. Subsequently, the pucks are cycled back through the upper portion.

In embodiments of the invention, the driving mechanism of the conveyor may be a sprocket wheel that engages with one or more lugs on each of the pucks. The openings of the sprocket may engage the one or more lugs on the pucks, and push the lug(s) and the puck forward along the conveyor track as the sprocket rotates. In some embodiments, the sprocket wheels may be provided in pairs, one on each side of each rail, and the pucks may be provided with two legs which straddle the rail such that lugs on each leg are engaged by the sprocket openings. In other embodiments, the puck legs themselves may be engaged directly by the sprocket openings. The lugs are preferably engaged with the sprockets at one end of the conveyor as the pucks travel along a curved portion of the rail around the sprocket from a lower portion to an upper portion of the conveyor, after which the pucks are pushed against each other as they travel along the upper portion of the rail. In embodiments having long rail lengths, one or more additional sprocket wheels may be provided at various intervals along each rail to engage the lug(s) on the pucks, or the puck legs, and impart additional force to the pucks as they travel along the rails.

Although less desirable, in alternative embodiments, the pucks may be advanced along each rail by one or more chain driving systems in the form of large chain drive wheels that briefly engage the pucks at one end of the conveyance system and push them into each other so that they slide along the rails. In these embodiments, one or more legs on the pucks engage with openings in the drive chain. For lengthy conveyance systems, one or more additional chain drive wheels may be provided at intervals along the rails to further urge the pucks being conveyed.

In embodiments of the invention, the conveyor may also include additional driving mechanisms in the lower portion in order to keep regular, consistent spacing between the pucks, such that the pucks are reliably engaged with the sprockets as they travel around a curved portion of the rail so as to avoid spaces between the pucks, and to avoid jamming or damage to the elements of the system (e.g., the pucks, the track, the sprocket, etc.). For example and without limitation, the conveyor may include a belt driver on the distal end of the lower portion of the conveyor, near the sprocket to catch-up and pack the pucks together in a tight formation just prior to reaching the sprocket wheel.

In embodiments of the invention, each puck supports a cup for holding a piece of produce. In some embodiments, each cup may be pivotally engaged with the puck, and may include one or more downwardly extending legs. The cup pivot may be parallel to the axis of the rail upon which the puck is engaged, and is preferably located at the center of the cup in order to allow the cup to be tilted in either lateral direction in order to allow produce to be dropped to one side or the other of the rail (i.e., perpendicular to the axis of the rail). The legs may be located at edges of the cup such that, for example, an actuator contacting a leg on the right side of a cup may tilt the right side of cup upward such that the produce is dropped to the left side of the rail; and an actuator contacting a leg on the left side of a cup may tilt the left side of cup upward such that the produce is dropped to the right side of the rail.

In order to prevent premature dropping of produce, in embodiments of the invention the cup pivot engages an opening on the puck having a lower slot and an upper open region. During most of the trip down the rail, the weight of the produce in the cup pushes the cup pivot into the lower slot by gravity, preventing the cup from tilting or dropping the produce. When the cup reaches the actuator adjacent to the sorting bin where the produce is to be dropped, one or more actuators first raise the cup such that the pivot is raised out of the slot into the upper open region where it may pivot freely, after which the same or different actuator(s) further raise(s) one side of the cup in order to cause the produce to drop down the other side.

In preferred embodiments, each cup may be provided with two downwardly extending legs located at opposite edges thereof, one on either side of each rail, and each actuator may be provided with two parallel movable arms located below the cup legs, one on either side of each rail. In these embodiments, one of the actuator arms is longer than the other. Thus, when the cup reaches the actuator adjacent to the sorting bin where the produce is to be dropped, the two actuator arms are raised to make contact with the two legs of the cup. This raises the cup such that the pivot is raised out of the slot into the upper open region where it may pivot freely. Then, when one of the cup legs reaches the end of the shorter arm, that leg loses support and drops, causing the cup to pivot in the direction of the shorter actuator arm, causing the produce to drop down that side of the rail. It is to be appreciated that in these embodiments, the produce will drop on the side of the rail where the shorter actuator arm is located. When the end of the longer arm is reached, the second leg loses support and cup returns to a level position and the pivot returns to the slot in the opening. The actuator arms are then lowered until the next cup containing produce to be dropped into this bin arrives. It is to be appreciated that in these embodiments, the actuator may be provided in a single structure that resembles a horseshoe having one arm that is longer than the other, with the central portion of the actuator pivotally attached to a cross member using a simple easily-cleaned structure such as, without limitation, a stainless steel pin.

Embodiments of the sorting, sizing and conveying methods and apparatus of the present invention may include a plurality of puck tracks running in parallel to allow for high volume of produce to be moved continuously through the system. The actuators of the presently disclosed system may be included in an actuation system positioned below the conveyors. For example and without limitation, a set of actuators may be in present in a single actuation module that runs in a perpendicular manner under several parallel conveyor tracks over a given sorting table, and controls the discharge of produce of a certain size and quality from the cups on those parallel conveyor tracks as the cups pass over the given sorting table.

In some embodiments, an actuation module may be provided adjacent to each sorting bin in the form of a hollow cross member mounted below and perpendicular to the set of parallel rails above. In these embodiments, one or more movable actuators are provided on the cross member adjacent to each rail, and one or more controllable electromagnets are provided inside each cross member adjacent to each actuator. Activation of one of the electromagnets (e.g., from neutral to electrified or vice versa, or between different current levels, etc.) causes movement of the adjacent actuator, which may make contact with one (or both) leg(s) of a cup holding a piece of produce, causing the cup to tilt and drop the produce into the sorting bin as described previously. It is to be appreciated that the electromagnet(s) and actuator(s) for a given bin are only activated by the system when a piece of produce previously identified by the system (using the camera, weights, and other sensors) reaches an actuator for that bin. In most embodiments, the actuators either contain a metallic part or are made from a metal that reacts to an electromagnetic field such that activation of the electromagnet causes movement of the actuator. It is to be appreciated that oscillating movement of an actuator may be accomplished by changing the direction of the magnetic field, such that in one direction the actuator may be raised (to cause the produce cup to drop its load) and in another direction the actuator may be lowered (so as not to affect the cup, or return to return the cup to level).

In some embodiments, one or more movable discs may be provided on or around each hollow cross member for each sorting bin, the discs being adjacent to movable actuators on the cross members. The cross members in these embodiments are mounted below and perpendicular to the set of parallel rails above, and one or more controllable electromagnets are provided inside each cross member adjacent to each disc. Activation of one of the electromagnets (e.g., from neutral to electrified or vice versa, or between different current levels, etc.) causes movement of an adjacent disc along the cross member, which pushes the disc against an adjacent actuator, which makes contact with one (or both) leg(s) of a cup holding a piece of produce causing the cup to tilt and drop the produce into the sorting bin. The surfaces of the disc(s) may be specially shaped or slanted to complement the shape of the adjacent actuator(s) in order to reduce friction and provide smooth operation. It is to be appreciated that the electromagnet(s) and disc(s) for a given bin should only be activated by the system when a piece of produce previously identified by the system (using the camera, weights, and other sensors) reaches that bin. In most embodiments, the discs either contain a metallic part or are made from a metal that reacts to an electromagnetic field, such that activation of the electromagnet causes movement of the disc in one direction or the other along the cross member. In these embodiments, the actuators themselves do not necessarily require any metallic parts. It is to be appreciated that lateral movement of a disc may be accomplished by changing the direction of the magnetic field, such that in one direction the disc may move toward an actuator (to push the actuator into one or both leg(s) of a produce cup to cause the produce cup to tilt), and in another direction the disc may move away from the actuator (so as not to affect the cup, or to return the cup to level).

In embodiments of the invention, the actuation systems of the present invention may be contained within a sealed body, reducing the clutter of the system in comparison to the actuators of conventional sizing and conveying systems. Each such actuation system may include one or more electromagnetic actuators that may come into contact with the cups when their electrical condition is changed (e.g., from neutral to electrified or vice versa, or between different current levels, etc.). For example and without limitation, the cameras, scales and other sensors in the system may have identified a particular piece of produce in a particular cup as belonging in a particular sorting bin. As the cup carrying that piece of produce arrives at the appropriate sorting bin, the electromagnetic actuator adjacent to that cup is activated, causing the cup to pivot and drop the produce into the bin. The actuation may be effected by changes in the local magnet field resulting from changes in the electrical condition of the electromagnetic actuators from within the sealed pipe.

In some embodiments, the electromagnetic components may be contained within a sealed pipe, such that they have no exterior exposure. As a result, such actuation systems can be exposed to many different cleaning processes to remove debris and contaminants. In embodiments of the invention, the track, pucks, discs and actuators may be made from non-corrodible material or have an outer layer that is made from a non-corrodible material. The use of a non-corrodible material makes it possible for the track, pucks, discs and actuators to be exposed to many different cleaning processes (including those that use water, aqueous solutions, or other cleaning materials that corrode metal) to remove debris and contaminants. This allows the presently disclosed systems to be more frequently and effectively washed, thereby allowing the systems to be much more sanitary than conventional systems.

In some embodiments, the one or more cups may run along a cup track that is parallel to the track for the pucks. The track may include sections that are proximate to each of the sorting tables or bins. Each of these sections may be in mechanical connection with a separate actuation mechanism that may change the position of the track, such that the pucks on the particular section of track are caused to tilt or pivot to discharge a piece of produce thereon into the sorting table or bin. For example, the actuator may cause the section of track to tilt laterally, rise, or fall, and thereby tilt the cup that is present at the section of the track so that it drops the produce it is carrying.

In some embodiments, the cups and pucks may comprise a single integrated part, or the cups may be fixedly attached to the pucks (cup-pucks). In these embodiments, there is no pivoting action to deliver produce from such a cup. Instead, the produce may be removed using a sweeper arm or by blowing air. In embodiments using sweeper arms, such arms may be in the form of actuators that are attached to the cross members below each rail for each bin. The sweeper arms may be made from or include metallic parts, which can be moved according to the electromagnetic field created by adjacent electromagnets inside the cross member. The cup-pucks may be provided with openings therein, through which the sweeper arm may be extended. In these embodiments, when the sweeper arm is activated, it extends through the opening in the adjacent cup-puck which contacts the produce in the cup and causes it to be dislodged and drop into a bin below. In other embodiments, the cup-pucks may include movable pieces that are provided in the bottom of each cup, with each piece having at least one leg that extends through an opening in the cup-puck. In these embodiments, when the cup-puck reaches a bin where the produce is to be deposited, the sweeper arm or actuator is activated thereby making contact with the movable downwardly extending leg. In some embodiments, the contact between the actuator and the leg causes the movable piece in the cup to be raised, thereby dislodging the produce in the cup. In other embodiments, the actuator may be slanted such that once it is activated (e.g., raised), the leg will travel along the actuator and be gradually moved upward, which gradually raises the movable piece in the bottom of the cup, eventually causing the produce in the cup to be smoothly dislodged and drop into a bin below.

In other embodiments, the cup-pucks may be small in order to support produce that comes in small sizes, such as blueberries or cherries. In these cup-puck embodiments, blasts of air are used to blow the produce out of the cup to a selected sorting bin below. The air is provided from a pneumatic source that is attached to each cross member, and which includes an outlet vent adjacent to each rail that is pointed toward the upper portions of the cup-pucks. As a cup-puck reaches a selected bin, a small blast of air is blown through the vent which blows the small piece of produce from the cup to a bin below. It is to be appreciated that the opening and closing of such air valves may be accomplished using electromagnets inside the cross member. In these embodiments, the vents include or are made of a metal that reacts to an electromagnetic field. The electromagnet may then be used to open and close the vent: the vent may be opened by providing a magnetic field in one direction, and closed by providing a magnetic field in another direction.

In order to introduce the produce into embodiments of the sorting methods and apparatus of the present invention, a first conveying system is provided which includes a plurality of rollers which support the loose produce. These rollers are provided on a first set of continuous parallel rails which overlap a portion of the rails of a second conveying system which carry the pucks and cups over the sorting bins. The loose produce is transferred from the rollers into individual cups in this overlapping region. The rails carrying the rollers of the first conveyor then curve downward, leaving only the rails of the second conveyor carrying the pucks and cups (now laden with produce) for conveyance to the sorting bins. The rollers may be supported by embodiments of supports that are similar to the pucks supporting the produce cups. In some embodiments, the roller supports have legs which straddle the rails of the first conveying system, such that, without limitation, indentations on the sides of the rails engage complementary protrusions on the insides of the legs; or protrusions on the sides of the rails engage complementary indentations on the insides of the legs. In alternative embodiments, the legs and rails may dovetail together, and/or the supports may be popped onto and off of the rails.

In some embodiments, elongated guides may be provided along the length of the rails. For example, and without limitation, ridges may be provided along the top surfaces of the rails, and the roller supports may have a complementary recess underneath that mates with and slides along the ridge. It is to be appreciated that one or more ridges may be provided at any suitable location along the rails including the top and/or one or both sides and/or the bottom of the rail, so long as complementary recess is provided on the roller support where it engages the ridge. It is also to be appreciated that the locations of the ridges and recesses may be reversed, such that the roller supports may be provided with ridges which engage complementary elongated recesses running along the lengths of the rails.

The structures supporting the rollers may also include outwardly extending lugs which engage a driving mechanism that is similar to the mechanism driving the pucks and cups. In embodiments of the invention, the driving mechanism of the introductory conveyor may be a sprocket wheel that engages with one or more lugs on each of the roller supports. The openings of the sprocket may engage a side of each lug, and push the lug and the roller support forward along the rails of the first introductory conveyor as the sprocket rotates. In some embodiments, the sprocket wheels may be provided in pairs, one on each side of each introductory rail, and the roller supports may be provided with two legs which straddle these rails such that lugs on each leg are engaged by the sprocket openings. In other embodiments, the legs themselves may be engaged directly by the sprocket openings. The lugs are engaged with the sprockets as the roller supports travel along a curved portion of the rail around the sprocket from a lower portion to an upper portion of the first conveyor after which the roller supports are pushed against each other as they travel along the upper portion of the rails. The rails for the first introductory conveyor are interleaved between the rails for the sorting conveyor, all in parallel, for a short distance so that loose produce may be transferred from the rollers into individual cups until the rollers drop out as they travel back down along the rails to a lower portion of the introductory conveyor system. This leaves only the sorting conveyors in the upper region which transport the individual pieces of produce, now in the cups, to the sorting areas.

In alternative embodiments, a single conveying mechanism may be provided that supports specially adapted rollers. These rollers are designed to hold individual pieces of produce in much the same way as the cups of other embodiments (roller-carriers), and carry the produce to the sorting bins. These embodiments utilize the same continuous rail and roller support (puck) structures as other embodiments. In these embodiments a plurality of continuous rails are provided in parallel to each other and form a single conveyor. The roller supports have legs which straddle the rails of the conveying system, such that, without limitation, indentations on the sides of the rails engage complementary protrusions on the insides of the legs; or protrusions on the sides of the rails engage complementary indentations on the insides of the legs. In alternative embodiments, the legs and rails may dovetail together, and/or the supports may be popped onto and off of the rails.

In some roller-carrier embodiments, elongated guides may be provided along the length of the rails. For example, and without limitation, ridges may be provided along the top surfaces of the rails, and the roller supports may have a complementary recess underneath that mates with and slides along the ridge. It is to be appreciated that one or more ridges may be provided at any suitable location along the rails including the top and/or one or both sides and/or the bottom of the rail, so long as complementary recess is provided on the roller support where it engages the ridge. It is also to be appreciated that the locations of the ridges and recesses may be reversed, such that the roller supports may be provided with ridges which engage complementary elongated recesses running along the lengths of the rails.

In some roller-carrier embodiments, the structures supporting the rollers may also include outwardly extending lugs which engage a driving mechanism that is similar to the mechanism driving the pucks of other embodiments. In embodiments of the invention, the driving mechanism of the single conveyor system may be a sprocket wheel that engages with one or more lugs on each of the roller supports. The openings of the sprocket may engage a side of each lug, and push the lug and the roller support forward along the rails of the conveyor as the sprocket rotates. In some embodiments, the sprocket wheels may be provided in pairs, one on each side of each rail, and the roller supports may be provided with two legs which straddle these rails such that lugs on each leg are engaged by the sprocket openings. In other embodiments, the legs themselves may be engaged directly by the sprocket openings. The lugs are engaged with the sprockets as the roller supports travel along a curved portion of the rail around the sprocket from a lower portion to an upper portion of the conveyor after which the roller supports are pushed against each other as they travel along the upper portion of the rails. The rails for the single conveyor of these embodiments transport the individual pieces of produce to the sorting areas.

In some roller-carrier embodiments, the rollers themselves are specially shaped in order to hold single pieces of produce. The rollers are pivotally mounted on the roller supports, and provided with one or more downwardly extending legs which function in the same way as the legs on the cups of other embodiments, allowing the rollers to be tilted in order to discharge any produce the roller may be carrying. The roller-carrier embodiments also include the cameras, scales and other sensors of the system used to identify a particular piece of produce in a particular roller-carrier as belonging in a particular sorting bin. The roller-carrier embodiments also include magnetically operated actuators adjacent to each rail at each sizing bin that may be provided in the form of any of the actuator embodiments described herein, which are capable of causing the rollers to be tilted to drop the produce into a selected bin. As a result, the roller-carrier embodiments eliminate the need for two conveyor systems.

In some roller-carrier embodiments, the rollers and supports may comprise a single integrated part, or the rollers may be fixedly attached to the supports (roller-pucks). In these embodiments, there is no pivoting action to deliver produce from such a roller-puck. Instead, the produce may be removed using a sweeper arm or by blowing air. In embodiments using sweeper arms, such arms may be in the form of actuators that are attached to the cross members below each rail for each bin. The sweeper arms may be made from or include metallic parts, which can be moved according to the electromagnetic field created by adjacent electromagnets inside the cross member. The roller-pucks may be provided with openings therein, through which the sweeper arm may be extended. In these embodiments, when the sweeper arm is activated, it extends through the opening in the adjacent roller-puck which contacts the produce in the roller and causes it to be dislodged and drop into a bin below. In other embodiments, the roller-pucks may include movable pieces that are provided with each roller, with each piece having at least one leg that extends through an opening in the roller-puck. In these embodiments, when the roller-puck reaches a bin where the produce is to be deposited, the sweeper arm or actuator is activated thereby making contact with the movable downwardly extending leg. In some embodiments, the contact between the actuator and the leg causes the movable piece of the roller to be moved, thereby dislodging the produce in the roller. In other embodiments, the actuator may be slanted such that once it is activated (e.g., raised), the leg will travel along the actuator and be gradually moved upward, which gradually raises the movable piece of the roller-puck, eventually causing the produce in the roller to be smoothly dislodged and drop into a bin below.

In other embodiments, the roller-pucks may be small in order to support produce that comes in small sizes, such as blueberries or cherries. In these roller-puck embodiments, blasts of air are used to blow the produce out of the roller to a selected sorting bin below. The air is provided from a pneumatic source that is attached to each cross member, and which includes an outlet vent adjacent to each rail that is pointed toward the upper portions of the roller-pucks. As a roller-puck reaches a selected bin, a small blast of air is blown through the vent which blows the small piece of produce from the roller to a bin below. It is to be appreciated that the opening and closing of such air valves may be accomplished using electromagnets inside the cross member. In these embodiments, the vents include or are made of a metal that reacts to an electromagnetic field. The electromagnet may then be used to open and close the vent: the vent may be opened by providing a magnetic field in one direction, and closed by providing a magnetic field in another direction.

It is to be appreciated that in alternative embodiments, although not preferred, the driving mechanisms for the roller-carrier embodiments may be chain wheels. The roller-carrier embodiments may also be provided with additional sprocket wheels and/or additional chain wheels at one or more additional locations along the lengths of the rails in order to help urge the roller supports forward in lengthy conveyor systems.

In one aspect, the invention may comprise a conveyor apparatus for transporting produce having a plurality of continuous rails provided in parallel to each other, each rail having top, bottom, and opposite side surfaces, wherein the top surface of each rail is smooth, and a continuous indentation is provided along each side surface; a plurality of pucks provided on each rail, each puck comprising a pair of legs defining an opening between the legs, wherein inside surfaces of each leg comprise a protrusion having a shape that is complementary to the indentations on the side surfaces of each rail for sliding along such indentations, and wherein outwardly extending lugs are provided on outside surfaces of each leg; and a plurality of parallel sprocket wheels, each such wheel provided adjacent to a curved portion of each rail, each such wheel comprising one or two rotatable parallel discs that may be provided on opposite sides of each such rail, each disc comprising a plurality of sprockets for engaging the lugs of said pucks in order to urge said pucks along said rails. In some aspects, at least one additional sprocket wheel is provided adjacent to another portion of each rail, each such additional wheel comprising two rotatable parallel discs provided on opposite sides of each rail, each disc comprising a plurality of sprockets for engaging the lugs of said pucks in order to further urge said pucks along said rails. In some aspects, each puck may further comprise a movable cup pivotally attached thereto for holding a piece of produce.

In another aspect, the invention may comprise an apparatus for selectively discharging pieces of produce having a rail having a central axis; at least one puck provided for movement along said rail, said puck including at least one opening therein; a movable cup on each puck for holding a piece of produce, each cup having at least one downwardly extending leg thereon and a pivot deployed in said at least one opening of said puck; at least one hollow cross member mounted below said rail having an orientation that is perpendicular to the axis of said rail, each such cross member enclosing at least one controllable electromagnet; and at least one movable actuator on said crossbar adjacent to said rail and to said at least one electromagnet for selectively contacting the leg of a cup to cause said cup to pivot and discharge said piece of produce when said electromagnet is activated. In some aspects, each cup may comprise a pair of downwardly extending legs, with one leg on each side of said rail, and said at least one movable actuator comprises two parallel lifting arms, with one such arm provided on each side of said rail corresponding to the positions of said legs, wherein one of said lifting arms is longer than the other of said lifting arms. In some aspects, at least one movable disc is provided around each cross member adjacent to each actuator for selectively moving along said cross member to contact such actuator when said electromagnet is activated.

In another aspect, the invention may comprise a conveyor apparatus for transporting produce having a plurality of continuous rails provided in parallel to each other, each rail having smooth exterior top, bottom, and opposite side surfaces, wherein at least one continuous mating surface is provided along at least one of said surfaces; and a plurality of pucks provided on each rail, each puck comprising a pair of legs defining an opening between the legs, wherein at least one inside surface of said opening comprises a mating surface that is complementary to the mating surface on each rail. In other aspects, a continuous indentation is provided along each side surface of each rail, and inside surfaces of each puck leg comprise a protrusion having a shape that is complementary to the indentations on the side surfaces of each rail for sliding along such indentations. In other aspects, outwardly extending lugs are provided on outside surfaces of each leg, and a plurality of parallel sprocket wheels are provided, each such wheel being adjacent to a curved portion of each rail, each such wheel comprising one or two rotatable parallel discs that may be provided on opposite sides of each such rail, each disc comprising a plurality of sprockets for engaging the lugs of said pucks as they travel around the curved portions of the rails in order to urge said pucks along said rails. In alternative aspects, one or more chain drive wheels are provided adjacent to a curved portion of each rail for engaging the legs of said pucks as they travel around the curved portions of the rails in order to urge said pucks along said rails.

In another aspect, the invention may comprise a conveyor apparatus for transporting produce comprising a plurality of continuous rails provided in parallel to each other, each rail having smooth exterior top, bottom, and opposite side surfaces, wherein at least one continuous mating surface is provided along at least one of said surfaces; and a plurality of pucks provided on each rail, each puck comprising a pair of legs defining an opening between the legs for straddling such rail, wherein at least one inside surface of each such opening comprises a mating surface that is complementary to a mating surface on each rail for slidable engagement between pucks and rails. In other aspects, the conveyor apparatus may include a continuous indentation is provided along each opposite side surface of each rail, and each inside surface of each puck leg comprises a protrusion having a shape that is complementary to the indentation on the corresponding side surface of each rail. In other aspects, the conveyor apparatus may include outwardly extending lugs are provided on outside surfaces of each puck leg, the apparatus further comprising a plurality of parallel sprocket wheels, each such wheel provided adjacent to a curved portion of each rail, each wheel comprising a plurality of sprockets for engaging lugs of said pucks as they travel around the curved portions of the rails in order to urge said pucks along said rails. In other aspects, the conveyor apparatus may include outwardly extending lugs provided on outside surfaces of each puck leg, the apparatus further comprising a plurality of parallel sprocket wheels, each such wheel provided adjacent to a curved portion of each rail, each such wheel comprising two rotatable parallel discs provided on opposite sides of each such rail, each disc comprising a plurality of sprockets for engaging the lugs of said pucks as they travel around the curved portions of the rails in order to urge said pucks along said rails. In other aspects, the conveyor apparatus may include at least one additional sprocket wheel provided adjacent to another portion of each rail, each such additional wheel comprising two rotatable parallel discs provided on opposite sides of each rail, each disc comprising a plurality of sprockets for engaging the lugs of said pucks in order to further urge said pucks along said rails. In other aspects, the conveyor apparatus may include a chain drive wheel provided adjacent to a curved portion of each rail for engaging at least one leg of a puck as it travels around the curved portion of a rail in order to urge said puck along said rail.

In other aspects, the conveyor apparatus may include one or more pucks, each puck further comprises a movable cup pivotally attached thereto for holding a piece of produce, and at least one downwardly extending leg located at an edge of said cup, said conveyor further comprising at least one hollow cross member mounted below said rails having an orientation that is perpendicular to the axis of said rails, each such cross member enclosing at least one controllable electromagnet adjacent to each rail; and at least one movable actuator on said crossbar adjacent to each rail and adjacent to said at least one electromagnet for selectively contacting a leg of one of said cups to cause said cup to pivot and discharge said piece of produce when said electromagnet is activated. In other aspects, each cup may comprise a pair of downwardly extending legs, with one leg on each side of said rail, and said at least one movable actuator comprises two parallel lifting arms, with one such arm provided on each side of said rail corresponding to the positions of said legs, wherein one of said lifting arms is longer than the other of said lifting arms. In other aspects, the conveyor apparatus may include at least one movable disc provided around each cross member adjacent to each actuator for selectively moving along said cross member to contact such actuator when said electromagnet is activated. In other aspects, the conveyor apparatus may include a cup fixedly attached to each puck for holding a piece of produce, and at least one movable member in said cup having a downwardly extending leg, said conveyor further comprising at least one hollow cross member mounted below said rails having an orientation that is perpendicular to the axis of said rails, each such cross member enclosing at least one controllable electromagnet adjacent to each rail; and at least one movable actuator on said crossbar adjacent to each rail and adjacent to said at least one electromagnet for selectively contacting a leg of one of said movable members to cause said movable member to rise and discharge said piece of produce when said electromagnet is activated.

In other aspects, the conveyor apparatus may include a second conveyor, said second conveyor comprising a second plurality of continuous rails provided in parallel to each other, and interleaved with said first plurality of continuous rails over a portion of their length, each rail of said second plurality having smooth exterior top, bottom, and opposite side surfaces, wherein at least one continuous mating surface is provided along at least one of said surfaces; and a plurality of carriers provided on each second rail, each carrier comprising a pair of legs defining an opening between the carrier legs for straddling such rail, wherein at least one inside surface of each such carrier leg opening comprises a mating surface that is complementary to a mating surface on each such rail for slidable engagement between carriers and rails. In other aspects, the conveyor apparatus may include a continuous indentation is provided along each opposite side surface of each second rail, and wherein each inside surface of each carrier leg comprises a protrusion having a shape that is complementary to the indentation on the corresponding side surface of each such rail. In other aspects, the conveyor apparatus may include outwardly extending lugs are provided on outside surfaces of each carrier leg, the apparatus further comprising a second plurality of parallel sprocket wheels, each such second wheel provided adjacent to a curved portion of each second rail, each second wheel comprising a plurality of sprockets for engaging lugs of said carriers as they travel around the curved portions of said rails in order to urge said carriers along said rails. In other aspects, the conveyor apparatus may include outwardly extending lugs provided on outside surfaces of each carrier leg, the apparatus further comprising a second plurality of parallel sprocket wheels, each such wheel provided adjacent to a curved portion of each second rail, each such second wheel comprising two rotatable parallel discs provided on opposite sides of each such rail, each disc comprising a plurality of sprockets for engaging the lugs of said carriers as they travel around the curved portions of said rails in order to urge said carriers along said rails.

In another aspect, the invention may comprise an apparatus for selectively discharging pieces of produce comprising at least one rail having a central axis; at least one puck provided for movement along said at least one rail; a movable cup pivotally attached to each puck for holding a piece of produce, each cup having at least one downwardly extending leg thereon; at least one hollow cross member mounted below said at least one rail having an orientation that is perpendicular to the axis of said at least one rail, each such cross member enclosing at least one controllable electromagnet adjacent to said at least one rail; and at least one electromagnetically movable actuator on said crossbar adjacent to said at least one rail and adjacent to said at least one electromagnet for selectively contacting a leg of one of said cups to cause said cup to pivot and discharge said piece of produce when said electromagnet is activated. In other aspects, the apparatus may include each cup having a pair of downwardly extending legs, with one leg on each side of said at least one rail, and said at least one movable actuator comprises two parallel lifting arms, with one such arm provided on each side of said rail corresponding to the positions of said legs, wherein one of said lifting arms is longer than the other of said lifting arms. In other aspects, the apparatus may include at least one electromagnetically movable disc provided around each cross member adjacent to each actuator for selectively moving along said cross member to contact such actuator when said electromagnet is activated. In other aspects, the apparatus may include a plurality of continuous rails provided in parallel to each other, each rail having smooth exterior top, bottom, and opposite side surfaces, wherein at least one continuous mating surface is provided along at least one of said surfaces; and wherein said at least one puck comprises a plurality of pucks provided on each rail, each puck comprising a pair of legs defining an opening between the legs for straddling such rail, wherein at least one inside surface of each such opening comprises a mating surface that is complementary to a mating surface on each rail for slidable engagement between pucks and rails. In other aspects, the apparatus may include a continuous indentation provided along each opposite side surface of each rail, and wherein each inside surface of each puck leg comprises a protrusion having a shape that is complementary to the indentation on the corresponding side surface of each rail. In other aspects, the apparatus may include outwardly extending lugs provided on outside surfaces of each puck leg, the apparatus further comprising a plurality of parallel sprocket wheels, each such wheel provided adjacent to a curved portion of each rail, each wheel comprising a plurality of sprockets for engaging lugs of said pucks as they travel around the curved portions of the rails in order to urge said pucks along said rails. In other aspects, the apparatus may include outwardly extending lugs provided on outside surfaces of each puck leg, the apparatus further comprising a plurality of parallel sprocket wheels, each such wheel provided adjacent to a curved portion of each rail, each such wheel comprising two rotatable parallel discs provided on opposite sides of each such rail, each disc comprising a plurality of sprockets for engaging the lugs of said pucks as they travel around the curved portions of the rails in order to urge said pucks along said rails.

In another aspect, the invention may comprise an apparatus for selectively discharging pieces of produce comprising at least one rail having a central axis; at least one puck provided for movement along said at least one rail; a cup fixedly attached to each puck for holding a piece of produce, each cup having at least one movable member thereon, said movable member having a downwardly extending leg thereon; at least one hollow cross member mounted below said at least one rail having an orientation that is perpendicular to the axis of said at least one rail, each such cross member enclosing at least one controllable electromagnet adjacent to said at least one rail; and at least one electromagnetically movable actuator on said crossbar adjacent to said at least one rail and adjacent to said at least one electromagnet for selectively contacting a leg of one of said movable members to cause said movable member to dislodge said piece of produce when said electromagnet is activated. In other aspects, the apparatus may include a plurality of continuous rails provided in parallel to each other, each rail having smooth exterior top, bottom, and opposite side surfaces, wherein at least one continuous mating surface is provided along at least one of said surfaces; and wherein said at least one puck comprises a plurality of pucks provided on each rail, each puck comprising a pair of legs defining an opening between the legs for straddling such rail, wherein at least one inside surface of each such opening comprises a mating surface that is complementary to a mating surface on each rail for slidable engagement between pucks and rails. In other aspects, the apparatus may include a continuous indentation is provided along each opposite side surface of each rail, and wherein each inside surface of each puck leg comprises a protrusion having a shape that is complementary to the indentation on the corresponding side surface of each rail. In other aspects, the apparatus may include outwardly extending lugs provided on outside surfaces of each puck leg, the apparatus further comprising a plurality of parallel sprocket wheels, each such wheel provided adjacent to a curved portion of each rail, each wheel comprising a plurality of sprockets for engaging lugs of said pucks as they travel around the curved portions of the rails in order to urge said pucks along said rails. In other aspects, the apparatus may include outwardly extending lugs provided on outside surfaces of each puck leg, the apparatus further comprising a plurality of parallel sprocket wheels, each such wheel provided adjacent to a curved portion of each rail, each such wheel comprising two rotatable parallel discs provided on opposite sides of each such rail, each disc comprising a plurality of sprockets for engaging the lugs of said pucks as they travel around the curved portions of the rails in order to urge said pucks along said rails.

In another aspect, the invention may comprise the steps introducing a items of produce onto each of a plurality of movable cups, each cup being pivotally or fixedly attached to one of a plurality of slidable pucks, wherein each puck is slidably engaged with a continuous rail having a central axis, each puck comprising a pair of puck legs defining an opening between the puck legs for straddling the rail, wherein at least one inside surface of each puck leg opening comprises a mating surface that is complementary to a continuous mating surface on the rail for slidable engagement between each puck and the rail; and urging said plurality of pucks against each other along the rail using a sprocket wheel adjacent to a curved portion of the rail, wherein the sprocket wheel comprises a plurality of sprockets which engage each of said plurality of pucks as the pucks travel around the curved portion of the rail. In other aspects, each cup may comprise at least one downwardly extending leg located at an edge of said cup, or may comprise a movable member having a downwardly extending leg, and a hollow cross member enclosing a controllable electromagnet may be mounted below said rail, the cross member having an orientation that is perpendicular to the axis of said rail, and a movable actuator is provided on the hollow cross member adjacent to the rail and adjacent to said controllable electromagnet, the method comprising the additional step of selectively activating said electromagnet when an item of produce is identified to cause said actuator to contact a downwardly extending leg of a cup or movable member to cause said cup to pivot or the movable member to rise and discharge the identified item of produce from said cup. In other aspects, the methods may comprise the additional step of further urging said plurality of pucks against each other along the rail using a second sprocket wheel provided adjacent to another portion of the rail, wherein the second sprocket wheel comprises a second plurality of sprockets which engage each of said plurality of pucks as the pucks travel along the rail. It is to be appreciated that in alternative embodiments, a plurality of parallel rails, sprocket wheels, hollow cross members, electromagnets and movable actuators may be provided.

It is therefore an object of the present invention to provide sanitary conveying and sorting systems that minimize the accumulation of contaminants and debris within the systems.

It is also an object of the present invention to provide conveying and sorting systems that are easy to clean and may be exposed to many strong cleaning agents without causing damage or deterioration.

It is also an object of the present invention to provide conveying and sorting methods and apparatus in which a plurality of load bearing pucks are urged along a plurality of smooth rails using sprocket wheels, instead of being carried on roller chains.

It is also an object of the present invention to provide conveying and sorting methods and apparatus having a plurality of pucks, each puck supporting a pivotally attached produce-carrying cup that may be tilted to discharge the produce in the cup by a magnetically operated actuator.

It is also an object of the present invention to provide conveying and sorting methods and apparatus having a plurality of cross members, with at least one cross member for each sorting bin, in which the cross members have magnetically operated actuators thereon for selectively contacting pivotally mounted produce-bearing cups to cause discharge of the produce in the cup to a bin.

It is also an object of the present invention to provide conveying and sorting systems having a plurality of cross members, each cross member supporting a plurality of magnetically operated actuators for contacting produce-bearing cups, in which the mechanical and magnetic components are provided inside the cross members and/or actuators.

It is also an object of the present invention to provide conveying and sorting systems having a plurality of cross members supporting a plurality of magnetically operated actuators and discs in which the mechanical and magnetic components are provided inside the cross members and/or actuators and/or discs.

It is also an object of the present invention to provide conveying and sorting systems in which the structures for the conveying and actuating components have smooth external surfaces reducing potential contamination by bacteria, contaminants and debris, and making them easily accessible for thorough cleaning.

It is also an object of the present invention to provide conveying and sorting systems that require less cleaning, allowing for longer continuous operation times and higher efficiency.

It is also an object of the present invention to provide conveying and sorting systems that may be quickly and easily broken down for cleaning.

Additional aspects and objects of the invention will be apparent from the detailed descriptions and the claims herein.

BRIEF DESCRIPTION OF THE DRAWINGS

FIG. 13 is a perspective view of an embodiment of a roller support of an embodiment of the invention.

DETAILED DESCRIPTION

Figure 1:
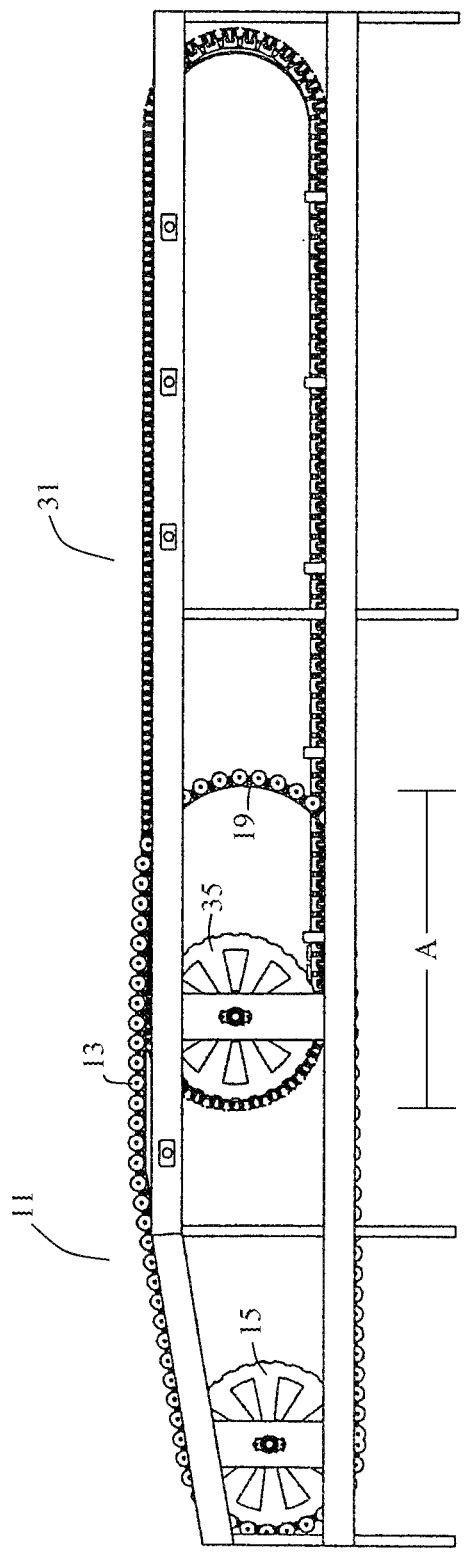
FIG. 1 is a side view of a conveyor system according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Referring to the drawings wherein like reference characters designate like or corresponding parts throughout the several views, it is seen that the present invention includes various embodiments of conveying and sorting systems utilizing a plurality of continuous rails which support a plurality of sliding pucks that are urged forward using a plurality of sprocket wheels, and which utilize magnetically operated activation components for causing produce to be selectively dropped from cups carried by the pucks into sorting bins.

Referring to FIGS. 1-7, it is seen that the illustrated embodiment includes a first conveyor system 11 for supporting loose produce, and a second conveyor system 31 for sorting the produce. The first and second conveyors overlap at region "A" where loose produce is transferred from the rollers 13 of the first conveyor to the cups 45 of the second conveyor. As noted below, in alternative embodiments, a single conveyor system may be provided that supports the loose produce and also transports it for sorting. Referring to the detail of FIG. 3 of the illustrated embodiment, it is seen that the first conveying system 11 includes a plurality of continuous parallel rails 12 defining a track that extends around a plurality of sprocket wheels 15 at one end. The rails 12 travel along an upper region of the conveyor 11 and then bend downward at 19 to a lower region of the conveyor before returning back to the sprocket wheels 15.

Figure 6:
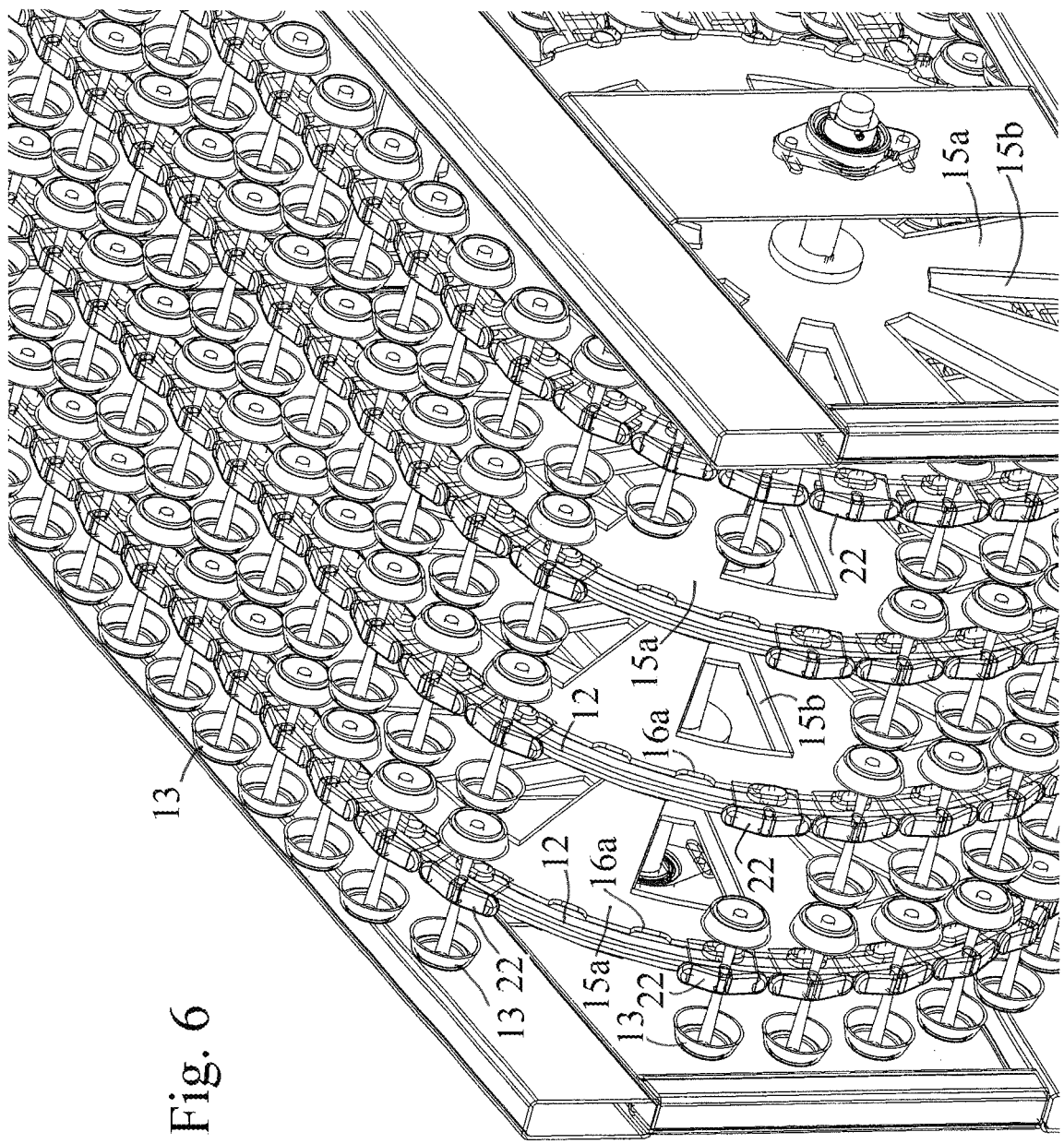
FIG. 6 is an enlarged perspective view of a conveyor system according to an embodiment of the present invention in which some of the rollers and supports have been removed.

Referring to the detail of FIG. 6, it is seen that in these embodiments a plurality of roller supports 22 are provided which support rollers 13 and which travel along rails 12 of the first conveyor system 11. Referring to FIG. 13, each support 22 includes a pair of downwardly extending legs 23a, 23b. The supports 22 and rails 12 are provided with corresponding mating surfaces which keep the supports 22 on the rails 12 as they slide along them. In these embodiments, each leg 23 is provided with a protrusion 24a, 24b on an inside surface, and a lug 25a, 25b on an outside surface. The protrusions 24 slidably engage corresponding elongated indentations along rails 12 as the supports 22 slide along these rails, holding the supports 22 on the rails 12. It is to be appreciated that in different embodiments, these mating surfaces may be interchanged such that elongated protrusions may be provided on the rails 12, and corresponding indentations may be provided on the supports 22. Also, in some embodiments, other mating surfaces may be provided for the rails and supports including, without limitation, recesses or protrusions on one of supports 22 or rails 12, and complementary protrusions or recesses on the other of supports 22 or rails 12.

Figure 3:
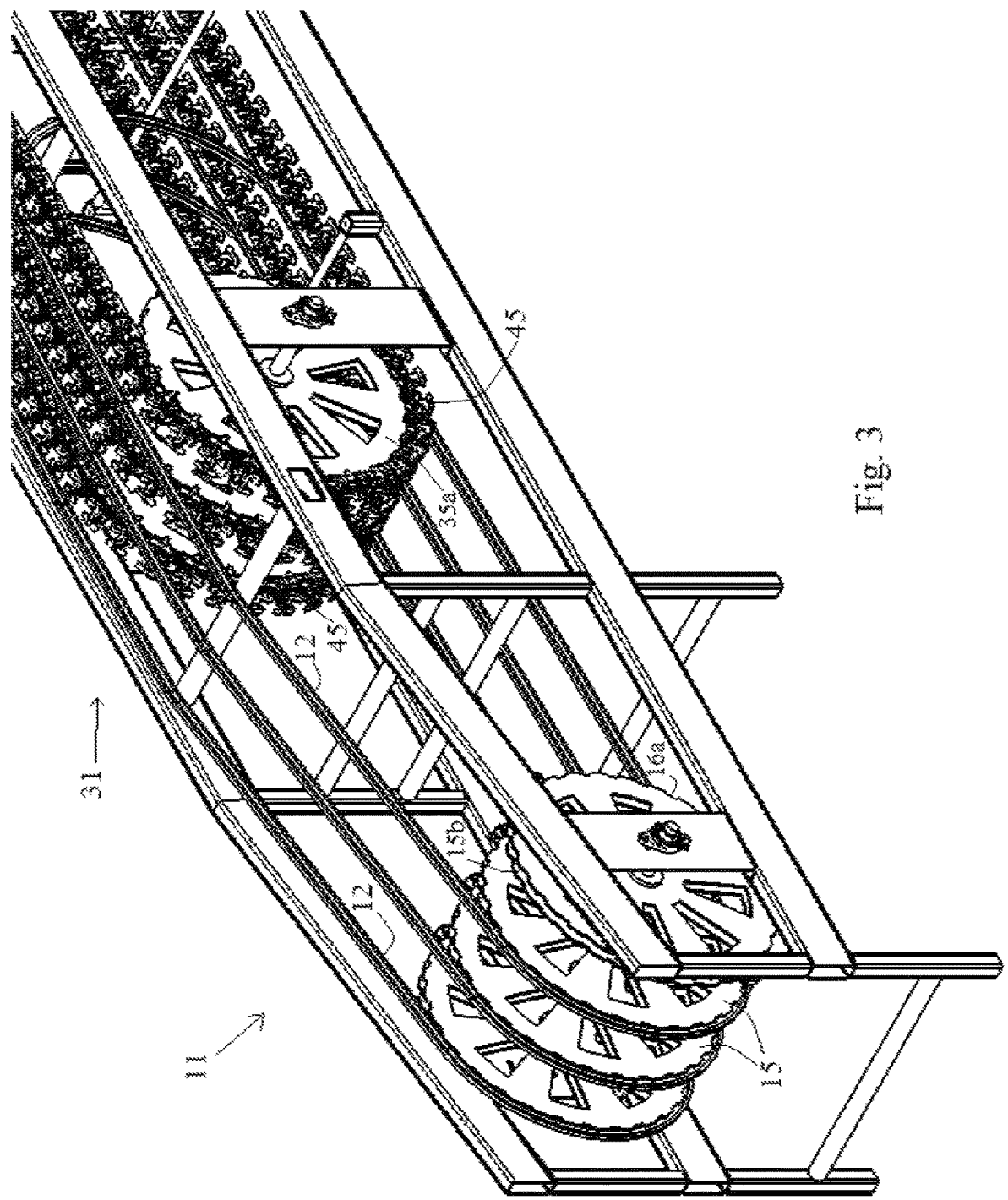
FIG. 3 is an enlarged view of a conveyor system according to an embodiment of the present invention where the rollers and supports of the first conveyor have been removed.

The lugs 25 on the outside surfaces of supports 22 engage openings 16 on the sprocket wheels 15 as the supports 22 travel along rails 12 around wheels 15. The wheels 15 impart motion to the supports 22 urging them along track 12. In preferred embodiments, each sprocket includes a pair of wheels 15a, 15b as shown in FIGS. 3 and 6, such that the openings 16a on one of the sprocket wheels 15a engage the lugs 25a on one side of the support 22, and the openings 16b on the other sprocket wheel 15b engage the lugs 25b on the other side of the support 22. In alternative embodiments, the sprocket wheels 15 may be replaced by chain wheels having gaps between the chain links which engage the legs of the supports 22.

Figure 2:
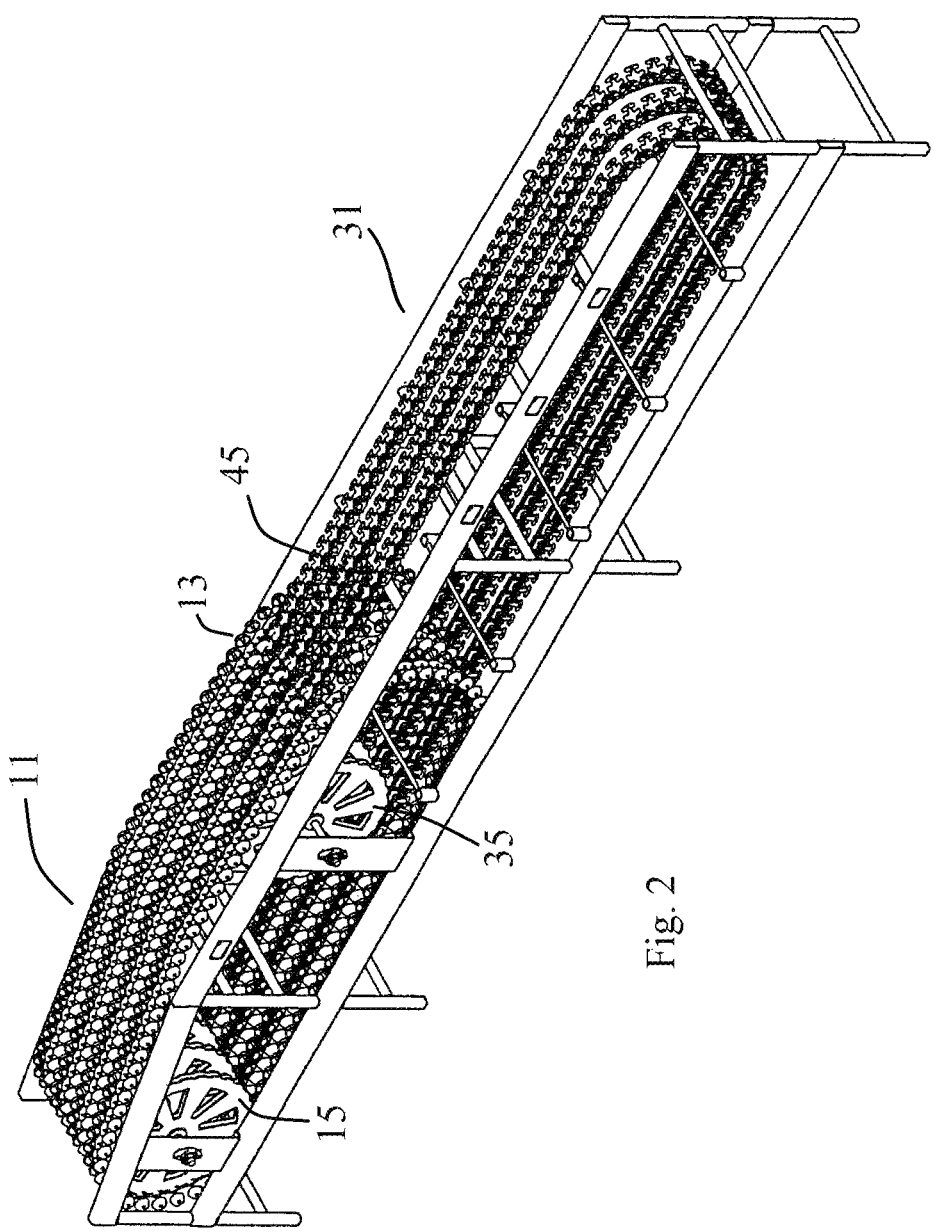
FIG. 2 is a perspective view of the embodiment of the conveyor system of FIG. 1.
Figure 4:
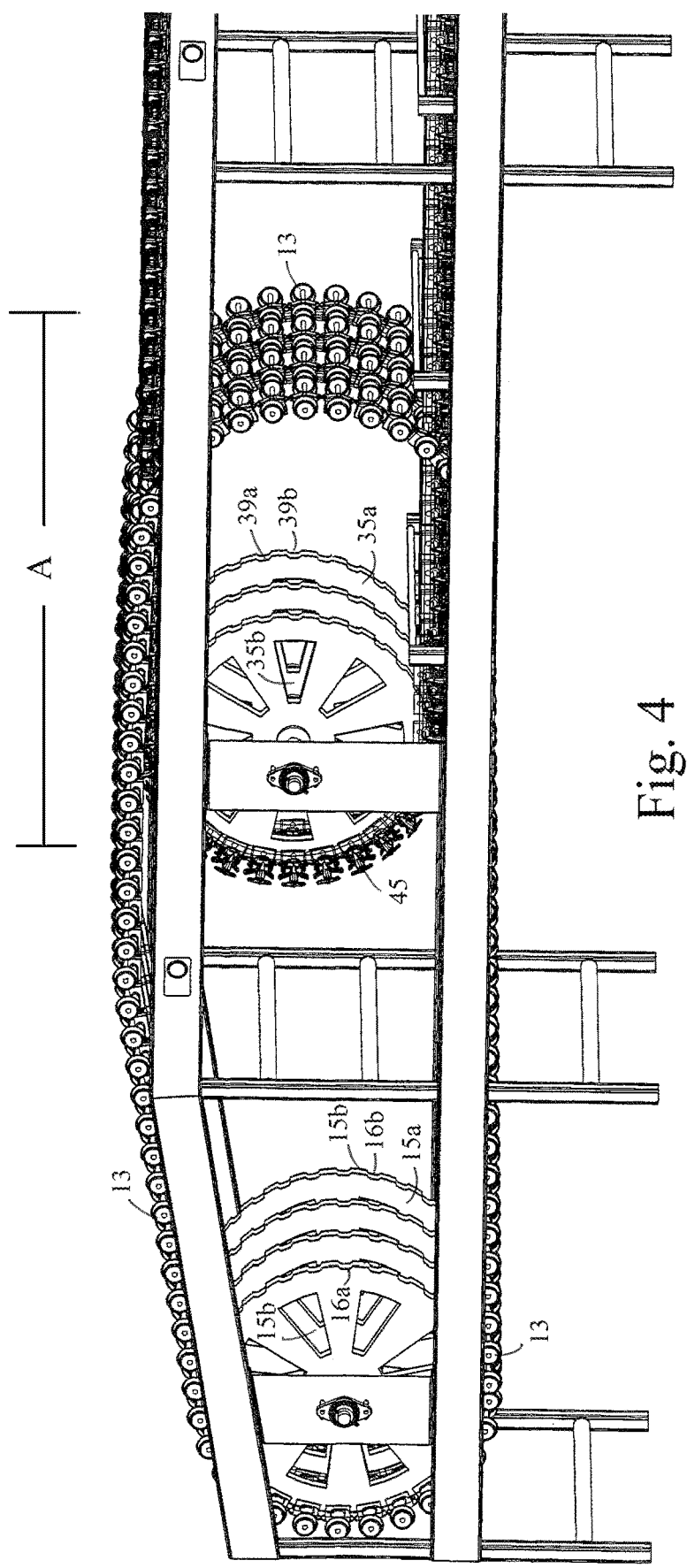
FIG. 4 is an enlarged side view of a conveyor system according to an embodiment of the present invention.
Figure 5:
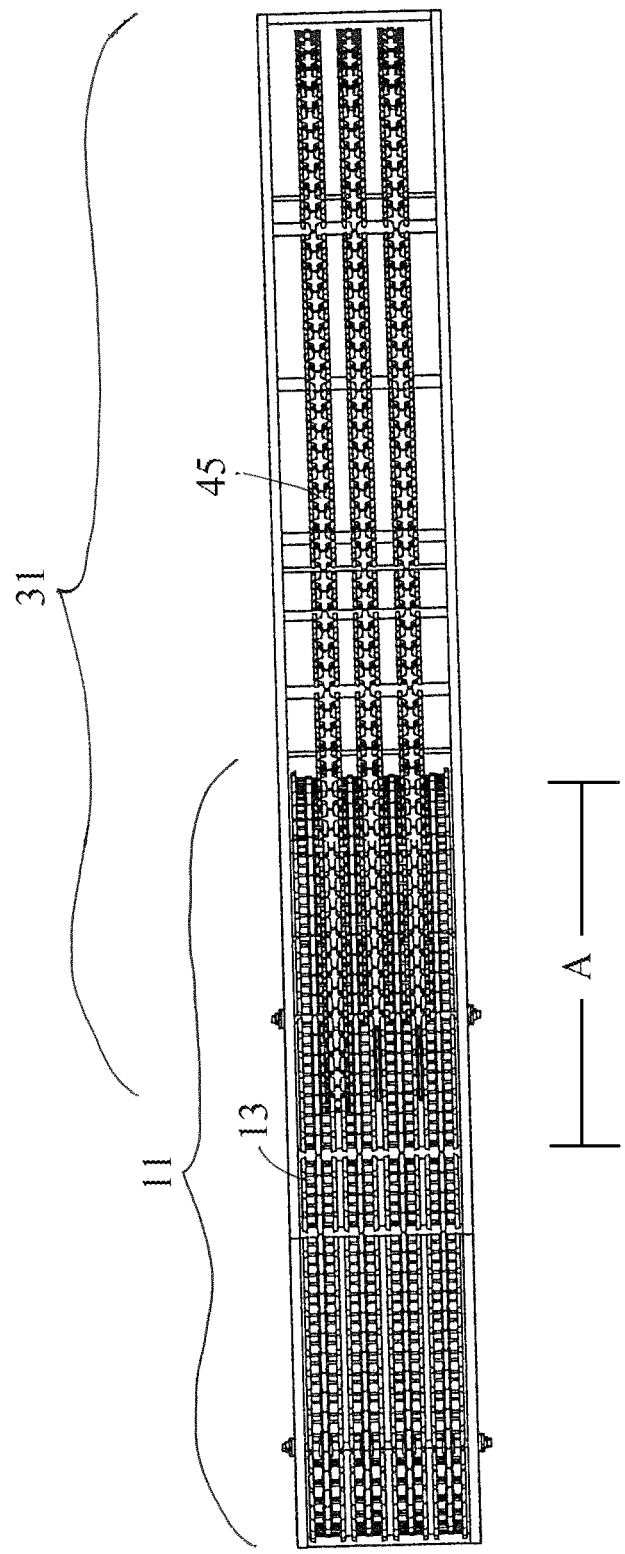
FIG. 5 is a top view of a conveyor system according to an embodiment of the present invention.

In the illustrated embodiments, each supports 22 holds a corresponding roller 13, and the rollers 13 are used to loosely support pieces of produce that are introduced to the first conveyor system. The produce is moved forward by rollers 13 as the supports 22 are driven along rails 12 of the first conveyor. The rails 12 of the first conveyor are interleaved with and between rails 32 of the second conveyor, as shown in FIGS. 2 and 3. Both sets of rails 12 and 32 are provided in parallel, and are next to each other in region "A" as illustrated in FIGS. 1, 4 and 5. In this region (A), loose produce is transferred from rollers 13 to cups 45 on the second conveyor. The rails 12 of the first conveyor drop out at the end of region "A" and bend downward at 19 to circle back to sprocket wheels 15, with supports 22 and rollers 13 traveling along them.

Referring to the illustrated embodiments of FIGS. 1, 8-12 and 14-18, it is seen that the second conveyor 31 includes a plurality of pucks 33 which support cups 45 and which travel along rails 32 of the second conveyor system 31. Each puck 33 includes a pair of downwardly extending legs 34a, 34b. The pucks 33 and rails 32 are provided with corresponding mating surfaces which keep the pucks 33 on the rails 32 as they slide along them. In the illustrated embodiment, each leg 34 is provided with a protrusion 36a, 36b on an inside surface, and a lug 37a, 37b on an outside surface, as shown in FIGS. 8-11. The protrusions 36 slidably engage corresponding elongated indentations 40a, 40b along the sides of rails 32 as the pucks 33 slide along these rails, holding the pucks 33 on the rails 32. It is to be appreciated that in different embodiments, these mating surfaces may be interchanged such that elongated protrusions may be provided on the rails 32, and corresponding indentations may be provided on the pucks 33. Also, in some embodiments, other mating surfaces may be provided for the rails and supports including, without limitation, recesses or protrusions on one of pucks 33 or rails 32, and complementary protrusions or recesses on the other of pucks 33 or rails 32.

Figure 7:
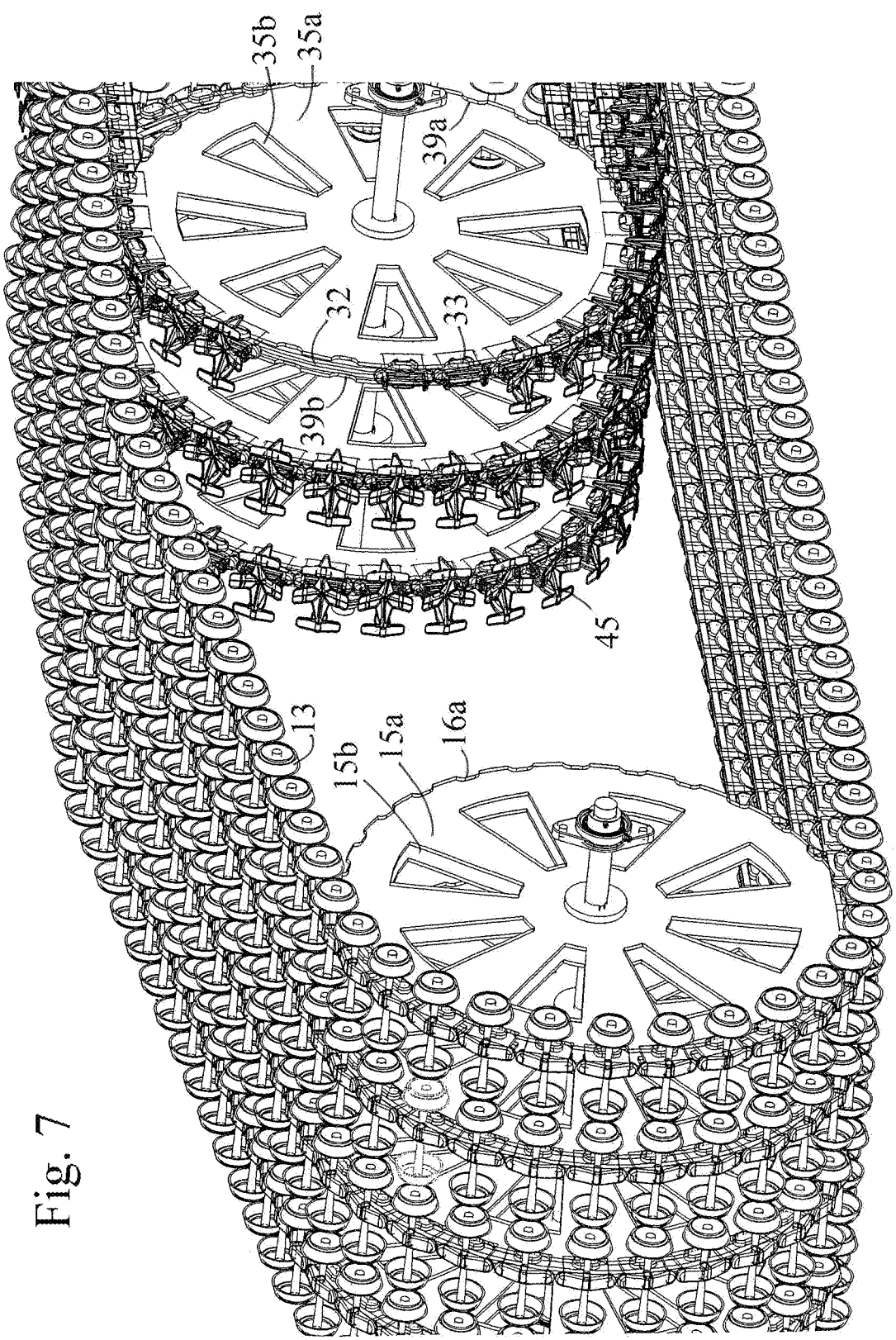
FIG. 7 is an enlarged perspective view of a conveyor system according to an embodiment of the present invention in which some of the cups and pucks have been removed.
Figure 8:
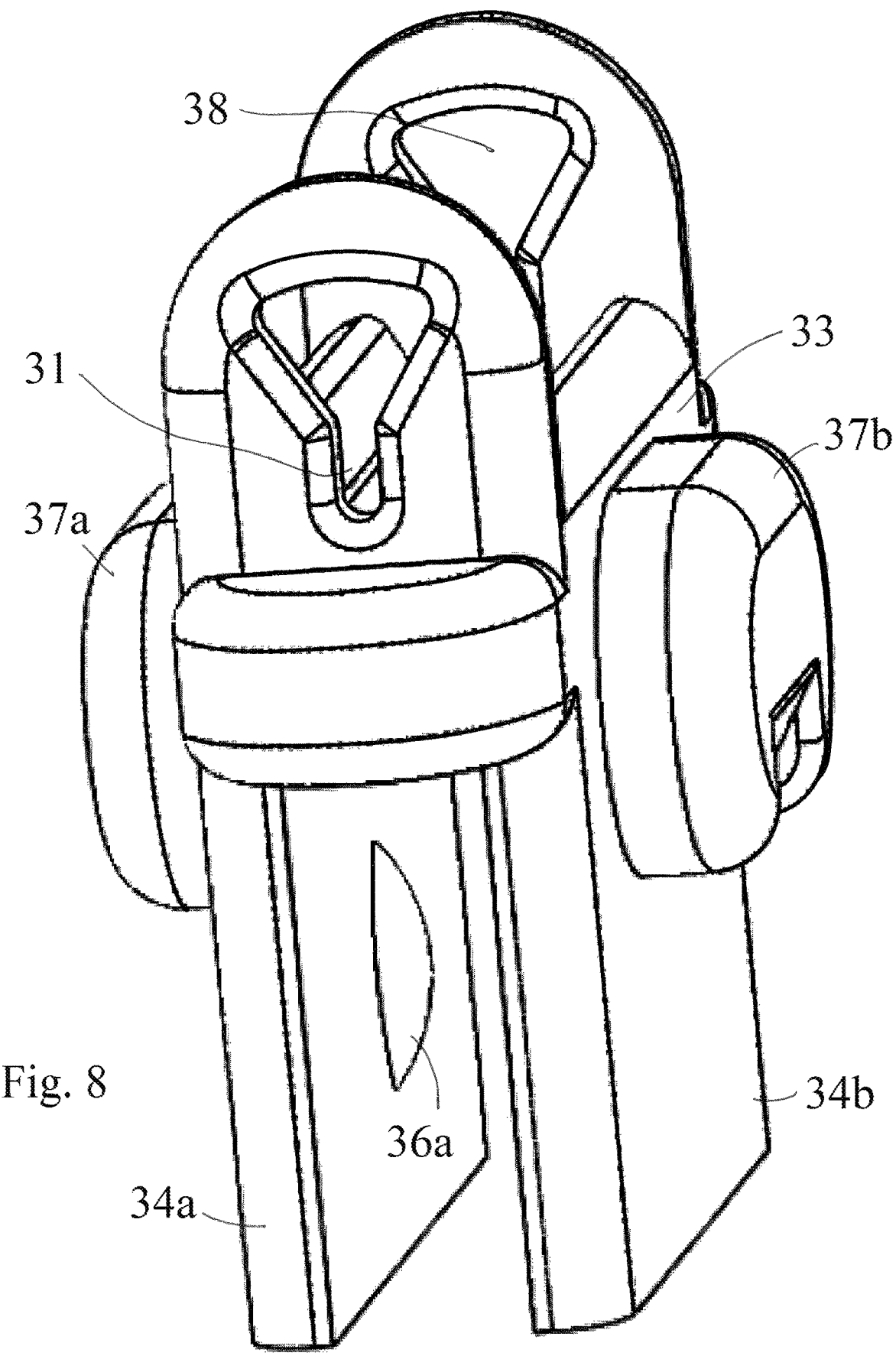
FIG. 8 is a perspective view of an embodiment of a puck (cup support) of an embodiment of the invention.

The lugs 37 on the outside surfaces of pucks 33 engage openings 39 on sprocket wheels 35 as the pucks 33 travel along rails 32 around wheels 35. The wheels 35 impart motion to the pucks 33 urging them along track 32. In preferred embodiments, each sprocket includes a pair of wheels 35a, 35b as shown in FIGS. 4 and 7, such that the openings 39a on one of the sprocket wheels 35a engage the lugs 37a on one side of the pucks 33, and the openings 39b on the other sprocket wheel 35b engage the lugs 37b on the other side of the pucks 33. In alternative embodiments, the sprocket wheels 35 may be replaced by chain wheels having gaps between the chain links which engage the legs of the pucks 33.

Referring to the illustrated embodiments of FIGS. 9-12 and 14-18, it is seen that a plurality of cups 45 are provided which are supported by pucks 33 which slide along rails 32. In the illustrated embodiment, each cup 45 is provided with a pair of legs 46a, 46b at outside edges thereof. It is to be appreciated that in some embodiments of the invention, cups 45 may be provided with a single leg 46, as described hereafter. At each sorting bin, a cross member 50 is provided which extends below rails 32 and is oriented perpendicular to them. (See FIGS. 12 and 18.) Cross members 50 may be in the form of a hollow tube, as shown in the illustrated embodiment. Below each rail 32, a movable actuator 52 is provided on a cross member 50. Each cross member 50 has a hollow interior, and may have any suitable cross-sectional shape (such as, for example, round, oval, square, rectangular, hexagonal, or the like) so long as a hollow interior is provided. In the illustrated embodiment, cross member 50 is provided in the form of a hollow pipe or tube. Each actuator 52 includes a pair of arms 51a, 51b which may have angled portions thereon. Each actuator body 52 with attached arms 51a, 51b may have a shape similar to that of a horseshoe, except that one of the arms (51b in the illustration) is shorter than the other arm (51a). (See FIG. 14.) The arms 51a, 51b are deployed on opposite sides of each rail 32. Actuator 52 is movably attached to cross member 50, preferably using a simple pin which acts as a pivot. At least one electronically controlled electromagnet 61 is provided inside hollow cross member 50 for each actuator 52. In some embodiments, each actuator 52 includes or is made of a metallic part which responds to the electromagnetic field created by the adjacent electromagnet inside cross member 50. Each actuator may be moved by changing the electromagnetic field adjacent to such actuator. When activated, the actuator 52 raises arms 51 upward, and when deactivated, arms 51 of actuator 52 are retracted.

Figure 9:
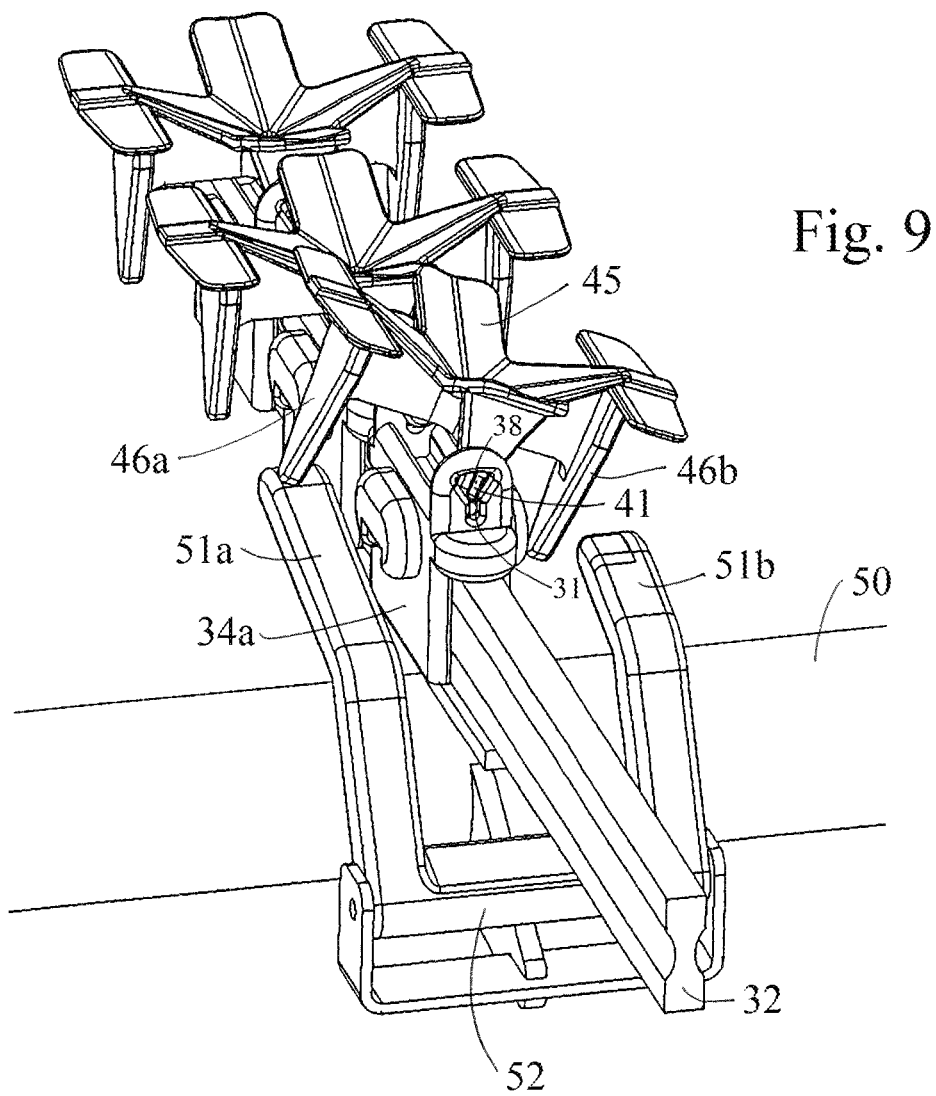
FIG. 9 is a perspective view of an embodiment of a produce dispensing and actuator mechanism of an embodiment of the invention.
Figure 10:
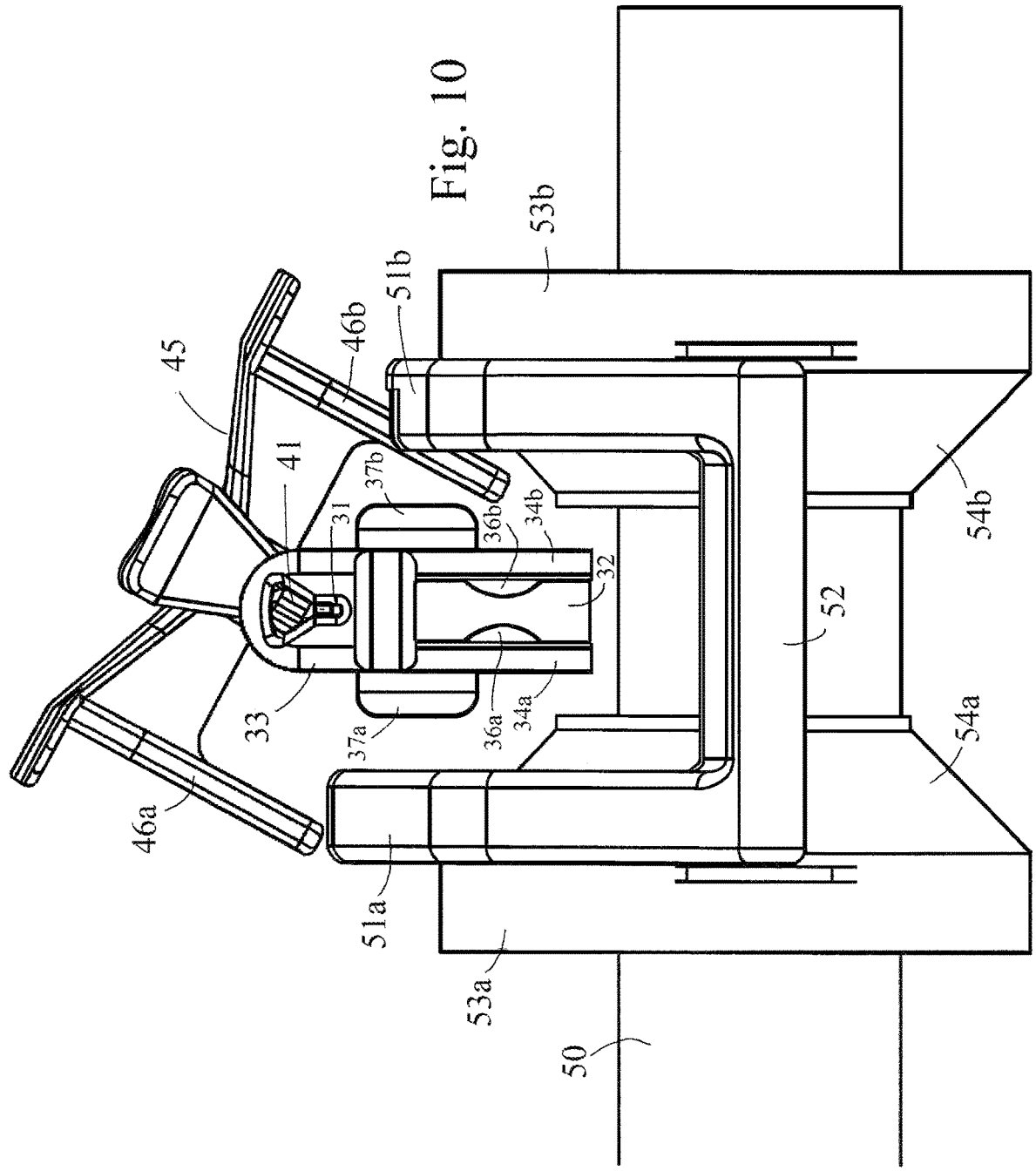
FIG. 10 is an end view of an embodiment of a produce dispensing and actuator mechanism of an embodiment of the invention.
Figure 11:
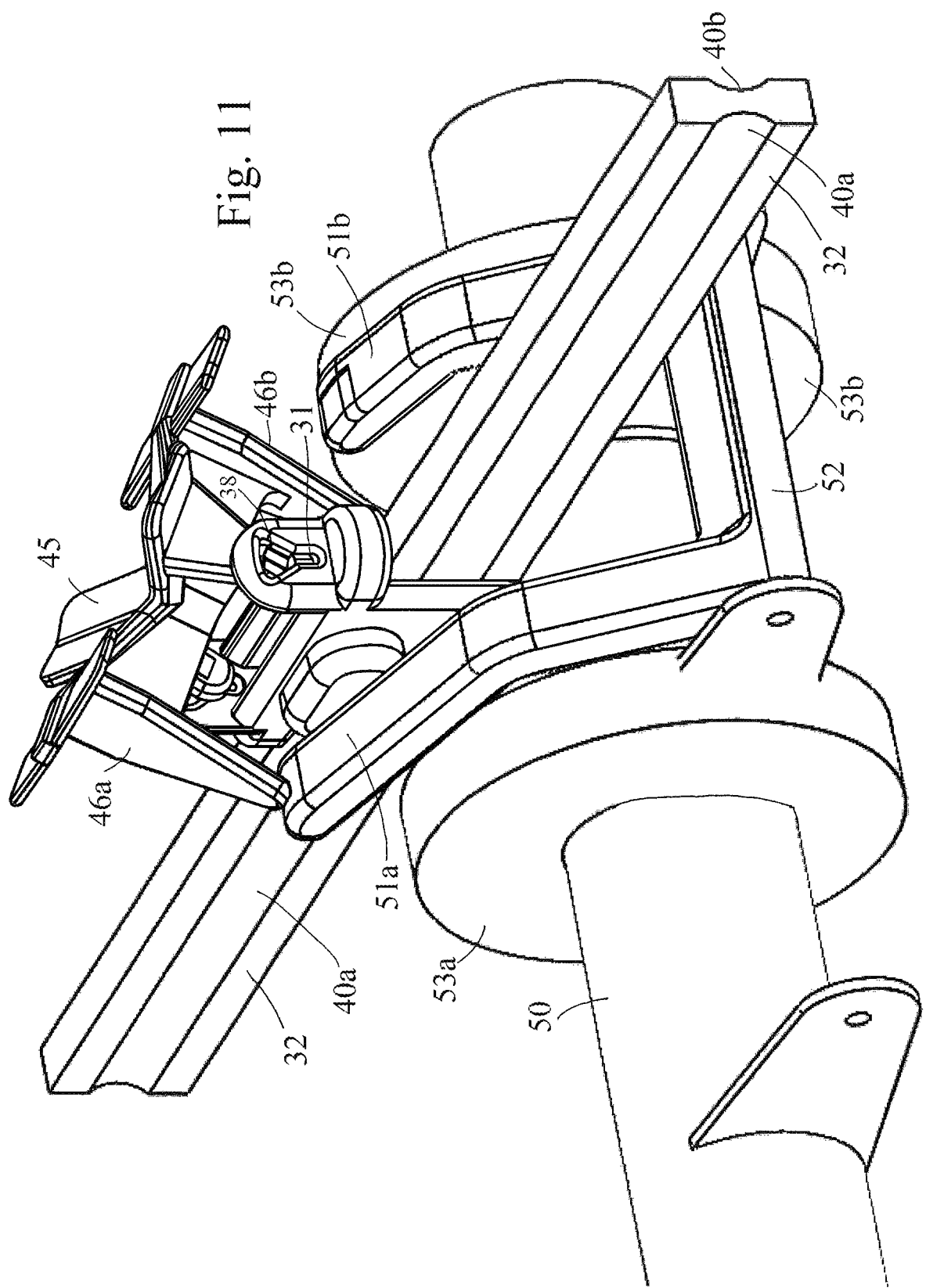
FIG. 11 is a perspective view of the produce dispensing and actuator mechanism illustrated in FIG. 10.

FIGS. 9-12 and 18 illustrate the operation of an embodiment of an actuator 52 of the present invention. It is to be appreciated that actuators 52 are provided along each rail at each sorting bin. An actuator 52 is only activated when a piece of produce being carried in a cup along the adjacent rail 32 is to be discharged into the sorting bin associated with that actuator. The selection of the bin for discharge of that particular piece of produce is made according to information obtained by cameras, scales and/or other sensors which evaluate the produce when it begins its journey through conveyor 31. When the cup 45 carrying identified piece of produce reaches the cross member 50 for the bin where it is to be deposited, the electromagnet 61 for the actuator 52 associated with the rail 32 carrying that cup 45 is activated. This causes the actuator arms 51a, 51b to be raised. The raising of arms 51 causes them to make contact with legs 46a, 46b of cup 45, raising the entire cup structure while keeping it level. This causes a pivot 41 supporting cup 45 to be raised from a lower position (FIG. 17) out of slot 31 to an open area 38 in puck 33 (FIG. 9). With the pivot 41 in open area 38, cup 45 may be freely pivoted in one direction or another, which will cause the produce it is carrying to be dropped. When one of the legs (46b in the illustrated embodiment) reaches the end of the shorter arm (51b in the illustrated embodiment), it loses support, causing cup 45 to tilt toward the direction of that leg (46b), and drop the produce it is carrying, as shown in FIGS. 9-11. After this occurs, the electromagnet 61 reverses the field which causes both arms 51a, 51b to be retracted, causing cup 45 to return to level, and causing pivot 41 to return to slot 31.

Figure 16:
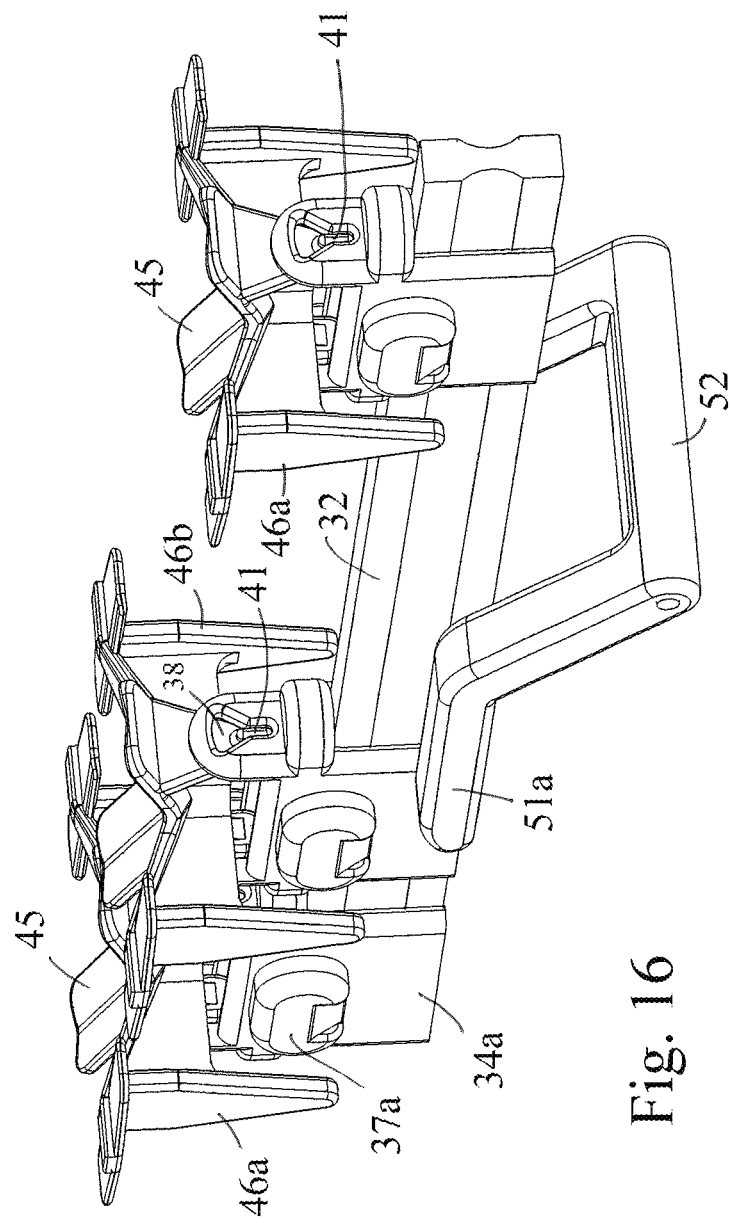
FIG. 16 is a perspective view of an embodiment of a cup, puck, rail and actuator of an embodiment of the present invention.
Figure 17:
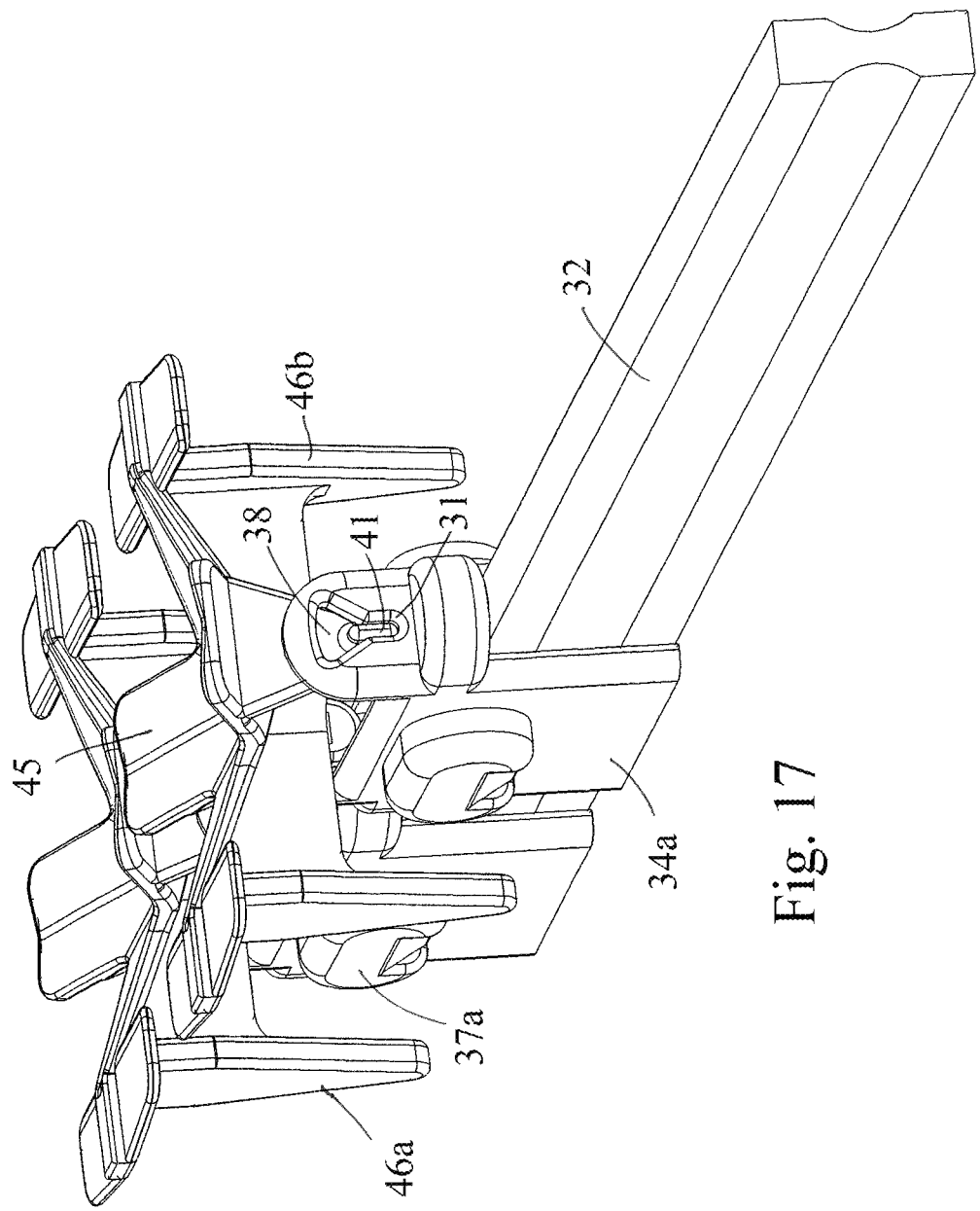
FIG. 17 is a perspective view of an embodiment of a cup, puck, and rail of an embodiment of the present invention.
Figure 18:
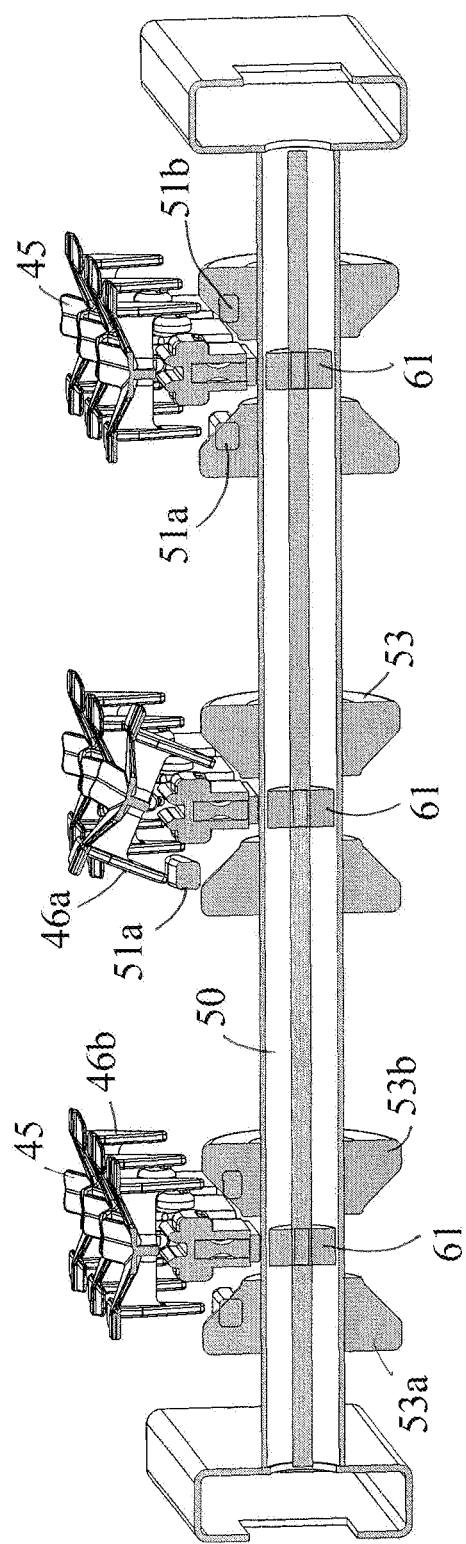
FIG. 18 is a cross-sectional view of an embodiment of a cross member of the present invention showing the internal electromagnets.

It is to be appreciated that each actuator 52 with arms 51a, 51b may be moved directly by the activation of the adjacent electromagnet 61 inside cross member 50, as illustrated in FIGS. 9 and 16. However, in other embodiments such as that depicted in FIGS. 10-12 and 18, one or more discs 53 may be provided on cross member 50, with at least one disc adjacent to each actuator 52. In the illustrated embodiments, two discs 53a, 53b are provided, one on either side of rail 32 for each actuator 52. Discs 53 may be made partly or completely of metal and/or include a metal portion that is capable of reacting to a magnetic field created by one or more adjacent electromagnets 61 inside cross member 50. Discs 53 are capable of traveling along the length of cross member 50, and are moved in one direction or the other along cross member 50 by the changing magnetic fields created by the adjacent electromagnet(s) 61. In the illustrated embodiments, activation of one or more electromagnets 61 in one way creates a magnetic field that moves both discs 53 inward, toward rail 32. Discs 53 are preferably provided with slanted (conical) interior portions 54 which make smooth contact with arms 51. This contact raises arms 51 on either side of rail 32, raising legs 46 of cup 45. As described with other embodiments, one arm (e.g. 51b) may be shorter than the other arm (e.g., 51a), such that when the corresponding leg (46b) reaches the end of the shorter arm (51b), the leg loses support and drops, causing cup 45 to pivot downward and drop the produce it is carrying. After this happens, the one or more electromagnets 61 reverse their magnetic field which causes both discs 53a, 53b to travel in opposite directions away from rail 32, causing actuator arms 51 to drop, allowing cup 45 to return to level, and causing pivot 41 to return to slot 31.

Figure 12:
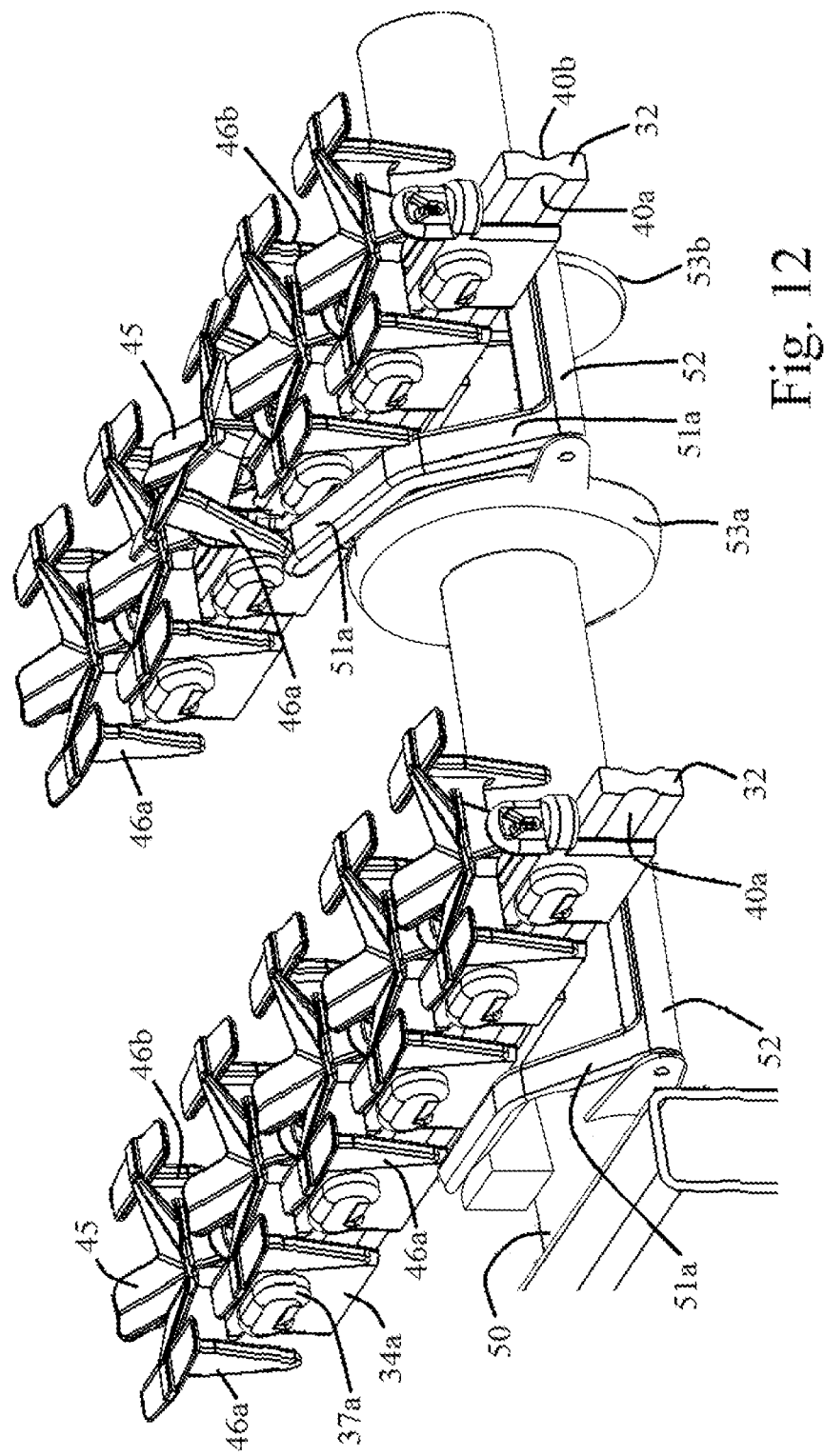
FIG. 12 is a perspective view of a plurality of produce dispensing and actuator mechanisms of an embodiment of the invention.
Figure 15:
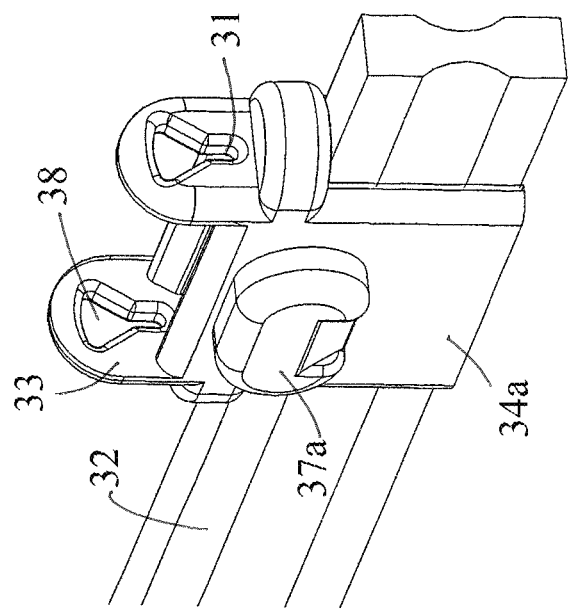
FIG. 15 is a perspective view of an embodiment of a puck (cup support) of an embodiment of the invention mounted on a rail.
Figure 14:
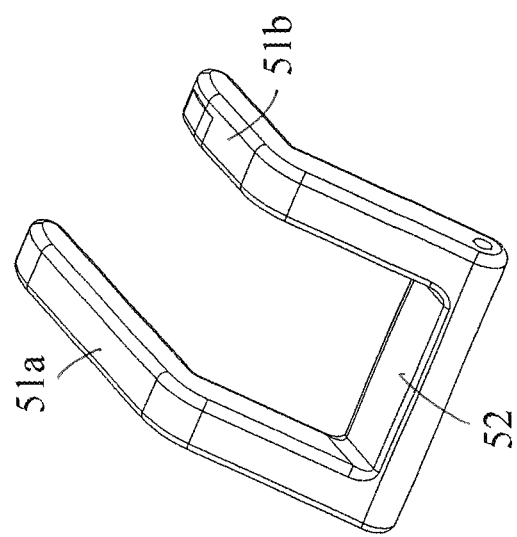
FIG. 14 is a perspective view of an actuator of an embodiment of the invention.

Although the illustrated embodiment of FIGS. 10-12 shows two discs 53a and 53b on opposite sides of rail 32, it is to be appreciated that in alternative embodiments, a single disc 53 may be provided on one side or the other of rail 32, along with an adjacent electromagnet 61 inside hollow member 50, to accomplish the same movement of actuator 52, since movement of any part of actuator 52 will also move both of the connected arms 51a, 51b.

In alternative embodiments, cups 45 may be provided with a single leg 46 at one side or the other. In these embodiments, actuators 50 have only one arm 51 that corresponds to the single leg 46. When raised, arm 51 contacts leg 46 causing cup 45 to tip and drop any produce it may be carrying.

Each cross member 50 is preferably sealingly attached to sides of the conveyor such that no contamination may enter or reach the interior of the cross member 50. The interior locations of the electromagnets 61 protects them from exterior contamination and minimizes exterior exposure of these components in the system, thereby reducing the potential for contaminants to accumulate on exterior system surfaces, and making the system easier to clean. Similarly, the discs, 53, actuators 52 and arms 51 are fully enclosed with smooth exterior surfaces which also minimizes the potential accumulation of contaminants and allows for efficient cleaning.

In alternative embodiments, a single conveyor system may be provided that supports the loose produce and also transports it for sorting. In such embodiments, the first conveyor 11 is eliminated, and the second conveyor is modified such that the plurality of pucks 33 support alternative versions of roller-carriers 49 (not shown) and which travel along the rails 32 of the conveyor system. Loose produce is introduced at the beginning of the conveyor, and the produce pieces migrate into individual roller-carriers 49 that are shaped so as not to bruise the produce, but to also hold individual pieces thereof. As with the second conveyor of other previously described embodiments, each puck 33 may include a pair of downwardly extending legs 34a, 34b. The pucks 33 and rails 32 are provided with corresponding mating surfaces which keep the pucks 33 on the rails 32 as they slide along them. Each leg 34 is provided with a protrusion 36a, 36b on an inside surface, and a lug 37a, 37b on an outside surface. The protrusions 36 slidably engage corresponding elongated indentations 40a, 40b along the sides of rails 32 as the pucks 33 slide along these rails, holding the pucks 33 on the rails 32. It is to be appreciated that in different embodiments, the mating surfaces may be interchanged such that elongated protrusions may be provided on the rails 32, and corresponding indentations may be provided on the pucks 33. Also, in some embodiments, other mating surfaces may be provided for the rails and supports including, without limitation, recesses or protrusions on one of pucks 33 or rails 32, and complementary protrusions or recesses on the other of pucks 33 or rails 32.

The lugs 37 on the outside surfaces of pucks 33 engage openings 39 on sprocket wheels 35 as the pucks 33 travel along rails 32 around wheels 35. The wheels 35 impart motion to the pucks 33 urging them along track 32. In preferred embodiments, each sprocket includes a pair of wheels 35a, 35b, such that the openings 39a on one of the sprocket wheels 35a engage the lugs 37a on one side of the pucks 33, and the openings 39b on the other sprocket wheel 35b engage the lugs 37b on the other side of the pucks 33. In alternative embodiments, the sprocket wheels 35 may be replaced by chain wheels having gaps between the chain links which engage the legs of the pucks 33.

Some roller-carrier embodiments may include a plurality of roller-carriers 49 supported by pucks 33 which slide along rails 32. In these embodiments, each roller-carrier 49 may be provided with a pair of legs 46a, 46b at outside edges thereof. It is to be appreciated that in some embodiments of the invention, roller-carriers 49 may be provided with a single leg 46, as described elsewhere herein, for activation by a single-arm actuator. At each sorting bin, a cross member 50 is provided which extends below rails 32 and is oriented perpendicular to them. Below each rail 32, a movable actuator 52 is provided on a cross member 50. Each cross member 50 has a hollow interior, and may have any suitable cross-sectional shape (such as, for example, round, oval, square, rectangular, hexagonal, or the like) so long as a hollow interior is provided. Each actuator 52 includes a pair of arms 51a, 51b which may have angled portions thereon. Each actuator body 52 with attached arms 51a, 51b may have a shape similar to that of a horseshoe, except that one of the arms may be shorter than the other arm (51a). The arms 51a, 51b are deployed on opposite sides of each rail 32. Actuator 52 is movably attached to cross member 50, preferably using a simple pin which acts as a pivot. At least one electronically controlled electromagnet 61 is provided inside hollow cross member 50 for each actuator 52. In some embodiments, each actuator 52 includes or is made of a metallic part which responds to the electromagnetic field created by the adjacent electromagnet inside cross member 50. Each actuator may be moved by changing the electromagnetic field adjacent to such actuator. When activated, the actuator 52 raises arms 51 upward, and when deactivated, arms 51 of actuator 52 are retracted.

In some roller-carrier embodiments, actuators 52 are provided along each rail at each sorting bin. An actuator 52 is only activated when a piece of produce being carried in a roller-carrier 49 along the adjacent rail 32 is to be discharged into the sorting bin associated with that actuator. The selection of the bin for discharge of that particular piece of produce is made according to information obtained by cameras, scales and/or other sensors which evaluate the produce when it begins its journey through conveyor 31. When the roller-carrier 49 carrying identified piece of produce reaches the cross member 50 for the bin where it is to be deposited, the electromagnet 61 for the actuator 52 associated with the rail 32 carrying that roller-carrier 49 is activated. This causes the actuator arms 51a, 51b to be raised. The raising of arms 51 causes them to make contact with legs 46a, 46b of cup 45, raising the entire cup structure while keeping it level. This causes a pivot 41 supporting roller-carrier 49 to be raised from a slot 31 to an open area 38 in puck 33. With the pivot 41 in open area 38, cup 45 may be freely pivoted in one direction or another, which will cause the produce it is carrying to be dropped. When one of the legs (e.g., 46b) reaches the end of the shorter arm (e.g., 51b), it loses support, causing roller-carrier 49 to tilt toward the direction of that leg (46b), and drop the produce it is carrying. After this occurs, the electromagnet 61 reverses the field which causes both arms 51a, 51b to be retracted, causing roller-carrier 49 to return to level, and causing pivot 41 to return to slot 31.

As with other embodiments, one or more discs 53 may be provided on cross member 50, with at least one disc adjacent to each actuator 52 to activate roller-carriers 49. In these embodiments, two discs 53a, 53b are provided, one on either side of rail 32 for each actuator 52. Discs 53 are made partly or completely of metal and/or include a metal portion that is capable of reacting to a magnetic field created by one or more adjacent electromagnets 61 inside cross member 50. Discs 53 are capable of traveling along the length of cross member 50, and are moved in one direction or the other along cross member 50 by the changing magnetic fields created by the adjacent electromagnet(s) 61. In the illustrated embodiment, activation of one or more electromagnets 61 in one way creates a magnetic field that moves both discs 53 inward, toward rail 32. Discs 53 are preferably provided with slanted (conical) interior portions 54 which make smooth contact with arms 51. This contact raises arms 51 on either side of rail 32, raising legs 46 of roller-carrier 49. As described with other embodiments, one arm (e.g. 51b) is shorter than the other arm (e.g., 51a), such that when the corresponding leg (46b) reaches the end of the shorter arm (51b), the leg loses support and drops, causing roller-carrier 49 to pivot downward and drop the produce it is carrying. After this happens, the one or more electromagnets 61 reverse their magnetic field which causes both discs 53a, 53b to travel in opposite directions away from rail 32, causing actuator arms 51 to drop, allowing roller-carrier 49 to return to level, and causing pivot 41 to return to slot 31.

Although some roller-carrier embodiment may use discs 53a and 53b on opposite sides of rail 32, it is to be appreciated that in alternative embodiments, a single disc 53 may be provided on one side or the other of rail 32, along with an adjacent electromagnet 61 inside hollow member 50, to accomplish the same movement of actuator 52, since movement of any part of actuator 52 will also move both of the connected arms 51a, 51b.

In alternative embodiments, roller-carrier 49 may be provided with a single leg 46 at one side or the other. In these embodiments, actuators 50 have only one arm 51 that corresponds to the single leg 46. When raised, arm 51 contacts leg 46 causing roller-carrier 49 to tip and drop any produce it may be carrying.

In some single-conveyor or dual-conveyor embodiments, the cups 45 and pucks 33 may comprise a single integrated part, or the cups may be fixedly attached to the pucks (cup-pucks). In these embodiments, there is no pivoting action to deliver produce from such a cup. Instead, the produce may be removed using a sweeper arm or by blowing air. In embodiments using sweeper arms, such arms may be in the form of actuators 52 that are attached to the cross members 50 below each rail for each bin. The sweeper arms may be made from or include metallic parts, which can be moved according to the electromagnetic field created by adjacent electromagnets 61 inside the cross member 50. The cup-pucks may be provided with openings therein, through which a sweeper arm 51 may be extended. In these embodiments, when the sweeper arm is activated, it extends through the opening in the adjacent cup-puck which contacts the produce in the cup and causes it to be dislodged and drop into a bin below. In other embodiments, the cup-pucks may include movable pieces 75 that are provided in the bottom of each cup, with each piece having at least one leg 76 that extends through an opening in the cup-puck. In these embodiments, when the cup-puck reaches a bin where the produce is to be deposited, the sweeper arm or actuator is activated thereby making contact with the movable downwardly extending leg 76. In some embodiments, the contact between the actuator and the leg causes the movable piece 75 in the cup to be raised, thereby dislodging the produce in the cup. In other embodiments, the actuator may be slanted such that once it is activated (e.g., raised), the leg will travel along the actuator and be gradually moved upward, which gradually raises the movable piece in the bottom of the cup, eventually causing the produce in the cup to be smoothly dislodged and drop into a bin below.

In other embodiments, the cup-pucks may be small in order to support produce that comes in small sizes, such as blueberries or cherries. In these cup-puck embodiments, blasts of air are used to blow the produce out of the cup to a selected sorting bin below. The air is provided from a pneumatic source that is attached to each cross member, and which includes an outlet vent 77 adjacent to each rail that is pointed toward the upper portions of the cup-pucks. As a cup-puck reaches a selected bin, a small blast of air is blown through the vent 77 which blows the small piece of produce from the cup to a bin below. It is to be appreciated that the opening and closing of such air valves may be accomplished using electromagnets 61 inside the cross member. In these embodiments, the vents include or are made of a metal that reacts to an electromagnetic field. The electromagnet may then be used to open and close the vent: the vent may be opened by providing a magnetic field in one direction, and closed by providing a magnetic field in another direction.

In some roller-cup embodiments, the rollers 13 and supports 22 may comprise a single integrated part, or the rollers 13 may be fixedly attached to the supports (roller-pucks, not shown). In these embodiments, there is no pivoting action to deliver produce from such a roller-puck. Instead, the produce may be removed using a sweeper arm or by blowing air. In embodiments using sweeper arms, such arms 51 may be in the form of actuators 52 that are attached to the cross members 50 below each rail for each bin. The sweeper arms may be made from or include metallic parts, which can be moved according to the electromagnetic field created by adjacent electromagnets 61 inside the cross member 50. The roller-pucks may be provided with openings therein, through which a sweeper arm 51a or 51b may be extended. In these embodiments, when the sweeper arm is activated, it extends through the opening in the adjacent roller-puck which contacts the produce in the roller and causes it to be dislodged and drop into a bin below. In other embodiments, the roller-pucks may include movable pieces 65 that are provided with each roller, with each piece having at least one leg 66 that extends through an opening in the roller-puck. In these embodiments, when the roller-puck reaches a bin where the produce is to be deposited, the sweeper arm or actuator 51 is activated thereby making contact with the movable downwardly extending leg 66. In some embodiments, the contact between the actuator and the leg causes the movable piece 65 of the roller to be moved, thereby dislodging the produce in the roller. In other embodiments, the actuator may be slanted such that once it is activated (e.g., raised), the leg will travel along the actuator and be gradually moved upward, which gradually raises the movable piece 65 of the roller-puck, eventually causing the produce in the roller to be smoothly dislodged and drop into a bin below.

In other embodiments, the rollers 13 and supports 22 may comprise a single integrated part, or the rollers 13 may be fixedly attached to the supports 22, and they may be small in order to support produce that comes in small sizes, such as blueberries or cherries. In these small roller-puck embodiments, blasts of air are used to blow the produce out of the roller to a selected sorting bin below. The air is provided from a pneumatic source that is attached to each cross member 50, and which includes an outlet vent 67 adjacent to each rail that is pointed toward the upper portions of the small roller-pucks. As a small roller-puck reaches a selected bin, a small blast of air is blown through the vent 67 which blows the small piece of produce from the small roller-puck to a bin below. It is to be appreciated that the opening and closing of such air valves 67 may be accomplished using electromagnets 61 inside the cross member 50. In these embodiments, the vents include or are made of a metal that reacts to an electromagnetic field. The electromagnet may then be used to open and close the vent: the vent may be opened by providing a magnetic field in one direction, and closed by providing a magnetic field in another direction.

It is to be appreciated that different features and aspects described herein may be utilized in different combinations in different embodiments of the present invention. For example, and without limitation, either single-piece roller-pucks (non-pivoting) or single piece cup-pucks (non-pivoting), may be used with either electromagnetically operated sweeper arms or blower vents, and may be provided in either single-conveyor or dual-conveyor systems of the present invention. In other examples, pivoting cups or pivoting rollers, and associated electromagnetic actuators, may be provided with either single-conveyor or dual-conveyor systems of the present invention.

It should be understood that the foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, and to thereby enable others skilled in the art to best utilize the invention and various embodiments with various modifications as are suited to the particular use contemplated.

What is claimed is:

1. A method of conveying produce for sorting comprising the steps of:
   a. introducing a items of produce onto each of a plurality of movable cups, each cup being pivotally attached to one of a plurality of slidable pucks, wherein each puck is slidably engaged with a continuous rail having a central axis, each puck comprising a pair of puck legs defining an opening between the puck legs for straddling the rail, wherein at least one inside surface of each puck leg opening comprises a mating surface that is complementary to a continuous mating surface on the rail for slidable engagement between each puck and the rail; and
   b. urging said plurality of pucks against each other along the rail using a first sprocket wheel located adjacent to a curved portion of the rail, wherein said sprocket wheel comprises a plurality of sprockets which engage each of said plurality of pucks as the pucks travel around the curved portion of the rail.

2. The method of claim 1 comprising the additional step of: further urging said plurality of pucks against each other along the rail using a second sprocket wheel provided adjacent to another portion of the rail, wherein the second sprocket wheel comprises a second plurality of sprockets which engage each of said plurality of pucks as the pucks travel along the rail.

3. The method of claim 2 wherein outwardly extending lugs are provided on outside surfaces of each of said pair of puck legs for engagement with the sprockets of said first and second sprocket wheels.

4. The method of claim 1 wherein each cup further comprises at least one downwardly extending leg located at an edge of said cup, and wherein a hollow cross member enclosing a controllable electromagnet is mounted below said rail, said cross member having an orientation that is perpendicular to the axis of said rail, and wherein a movable actuator is provided on said hollow cross member adjacent to the rail and adjacent to said controllable electromagnet, the method comprising the additional step of:
   selectively activating said electromagnet when an item of produce is identified to cause said actuator to contact a downwardly extending leg of a cup to cause said cup to pivot and discharge the identified item of produce from said cup.

5. The method of claim 4 comprising the additional step of: further urging said plurality of pucks against each other along the rail using a second sprocket wheel provided adjacent to another portion of the rail, wherein the second sprocket wheel comprises a second plurality of sprockets which engage each of said plurality of pucks as the pucks travel along the rail.

6. The method of claim 5 wherein outwardly extending lugs are provided on outside surfaces of each of said pair of puck legs for engagement with the sprockets of said first and second sprocket wheels.

7. The method of claim 4 wherein each movable cup comprises a pair of downwardly extending legs, with one leg on each side of the rail, and said movable actuator comprises two parallel lifting arms, with one such arm provided on each side of the rail corresponding to the positions of said pair of cup legs, wherein one of said parallel lifting arms is longer than the other of said parallel lifting arms.

8. The method of claim 4 further comprising a movable disc provided around said cross member adjacent to said movable actuator for selectively moving along said at least one hollow cross member to contact said movable actuator when said electromagnet is activated.

9. A method of conveying produce for sorting comprising the steps of:
   a. introducing a items of produce onto each of a plurality of movable cups, each cup being fixedly attached to one of a plurality of slidable pucks, wherein each puck is slidably engaged with a continuous rail having a central axis, each puck comprising a pair of puck legs defining an opening between the puck legs for straddling the rail, wherein at least one inside surface of each puck leg opening comprises a mating surface that is complementary to a continuous mating surface on the rail for slidable engagement between each puck and the rail; and
   b. urging said plurality of pucks against each other along the rail using a first sprocket wheel located adjacent to a curved portion of the rail, wherein said sprocket wheel comprises a plurality of sprockets which engage each of said plurality of pucks as the pucks travel around the curved portion of the rail.

10. The method of claim 9 wherein each cup further comprises at least one movable member said movable member having a downwardly extending leg located thereon, and wherein a hollow cross member enclosing a controllable electromagnet is mounted below said rail, said cross member having an orientation that is perpendicular to the axis of said rail, and wherein a movable actuator is provided on said hollow cross member adjacent to the rail and adjacent to said controllable electromagnet, the method comprising the additional step of:
    selectively activating said electromagnet when an item of produce is identified to cause said actuator to contact said downwardly extending leg of said movable member to cause said movable member to rise and discharge the identified item of produce from said cup.

11. The method of claim 10 comprising the additional step of: further urging said plurality of pucks against each other along the rail using a second sprocket wheel provided adjacent to another portion of the rail, wherein the second sprocket wheel comprises a second plurality of sprockets which engage each of said plurality of pucks as the pucks travel along the rail.

12. A method of conveying produce for sorting comprising the steps of:
    a. introducing a items of produce onto each of a plurality of movable cups, each cup being pivotally attached to one of a plurality of slidable pucks, wherein each puck is slidably engaged with one of a plurality of continuous rails provided in parallel to each other along an axis, each puck comprising a pair of puck legs defining an opening between the puck legs for straddling each such rail, wherein at least one inside surface of each puck leg opening comprises a mating surface that is complementary to a continuous mating surface on one of the plurality of rails for slidable engagement between each puck and each such rail; and
    b. urging said plurality of pucks against each other along each of the plurality of rails using a plurality of first sprocket wheels, said sprocket wheels located adjacent to a curved portion of each of the plurality of rails, wherein each of the plurality of sprocket wheels comprises a plurality of sprockets which engage each of said plurality of pucks as the pucks travel around the curved portions of each of the plurality of rails.

13. The method of claim 12 wherein each cup of the plurality of cups further comprises at least one downwardly extending leg located at an edge of each such cup, and wherein at least one hollow cross member enclosing at least one controllable electromagnet is mounted below said plurality of rails, said at least one cross member having an orientation that is perpendicular to the axis of said plurality of rails, and wherein at least one movable actuator is provided on said at least one hollow cross member adjacent to the plurality of rails and adjacent to said at least one controllable electromagnet, the method comprising the additional step of:

selectively activating one of said controllable electromagnets when an item of produce is identified to cause an actuator to contact a downwardly extending leg of a cup to cause said cup to pivot and discharge the identified item of produce from said cup.

14. The method of claim 13 comprising the additional step of: further urging said plurality of pucks against each other along the plurality of rails using a plurality of second sprocket wheels provided adjacent to another portion of said plurality of rails, wherein each of wheels of said plurality of second sprocket wheels comprises a second plurality of sprockets which engage each of said plurality of pucks as the pucks travel along the plurality of rails.

15. A method of conveying produce for sorting comprising the steps of:
 a. introducing a items of produce onto each of a plurality of movable cups, each cup being pivotally attached to one of a plurality of slidable pucks, wherein each puck is slidably engaged with a continuous rail having a central axis, each puck comprising a pair of puck legs defining an opening between the puck legs for straddling the rail, wherein at least one inside surface of each puck leg opening comprises a mating surface that is complementary to a continuous mating surface on the rail for slidable engagement between each puck and the rail; and
 b. urging said plurality of pucks against each other along the rail.

16. The method of claim 15 wherein each cup further comprises at least one downwardly extending leg located at an edge of said cup, and wherein a hollow cross member enclosing a controllable electromagnet is mounted below said rail, said cross member having an orientation that is perpendicular to the axis of said rail, and wherein a movable actuator is provided on said hollow cross member adjacent to the rail and adjacent to said controllable electromagnet, the method comprising the additional step of:

selectively activating said electromagnet when an item of produce is identified to cause said actuator to contact a downwardly extending leg of a cup to cause said cup to pivot and discharge the identified item of produce from said cup.

17. The method of claim 16 wherein each movable cup comprises a pair of downwardly extending legs, with one leg on each side of the rail, and said movable actuator comprises two parallel lifting arms, with one such arm provided on each side of the rail corresponding to the positions of said pair of cup legs, wherein one of said parallel lifting arms is longer than the other of said parallel lifting arms.

18. The method of claim 16 further comprising a movable disc provided around said cross member adjacent to said movable actuator for selectively moving along said at least one hollow cross member to contact said movable actuator when said electromagnet is activated.

19. The method of claim 15 wherein the step of urging said plurality of pucks against each other along the rail is accomplished using a drive chain located adjacent to the rail, wherein said drive chain comprises a plurality of openings which engage each of said plurality of pucks as the pucks travel along the rail.

20. A method of conveying produce for sorting comprising the steps of:
 a. introducing a items of produce onto each of a plurality of movable cups, each cup being fixedly attached to one of a plurality of slidable pucks, wherein each puck is slidably engaged with a continuous rail having a central axis, each puck comprising a pair of puck legs defining an opening between the puck legs for straddling the rail, wherein at least one inside surface of each puck leg opening comprises a mating surface that is complementary to a continuous mating surface on the rail for slidable engagement between each puck and the rail; and
 b. urging said plurality of pucks against each other along the rail.

21. The method of claim 20 wherein each cup further comprises at least one movable member said movable member having a downwardly extending leg located thereon, and wherein a hollow cross member enclosing a controllable electromagnet is mounted below said rail, said cross member having an orientation that is perpendicular to the axis of said rail, and wherein a movable actuator is provided on said hollow cross member adjacent to the rail and adjacent to said controllable electromagnet, the method comprising the additional step of:

selectively activating said electromagnet when an item of produce is identified to cause said actuator to contact said downwardly extending leg of said movable member to cause said movable member to rise and discharge the identified item of produce from said cup.

22. The method of claim 20 wherein the step of urging said plurality of pucks against each other along the rail is accomplished using a drive chain located adjacent to the rail, wherein said drive chain comprises a plurality of openings which engage each of said plurality of pucks as the pucks travel along the rail.

* * * * *